United States Patent
Lee

(10) Patent No.: US 11,005,820 B2
(45) Date of Patent: May 11, 2021

(54) DEVICE AND METHOD FOR ESTABLISHING SECURITY ASSOCIATION IN COMMUNICATION SYSTEM

(71) Applicant: Samsung Electronics Co., Ltd., Suwon-si (KR)

(72) Inventor: Shijae Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 15/547,357

(22) PCT Filed: Jan. 27, 2016

(86) PCT No.: PCT/KR2016/000879
§ 371 (c)(1),
(2) Date: Jul. 28, 2017

(87) PCT Pub. No.: WO2016/122205
PCT Pub. Date: Aug. 4, 2016

(65) Prior Publication Data
US 2018/0026946 A1    Jan. 25, 2018

(30) Foreign Application Priority Data
Jan. 28, 2015  (KR) .................. 10-2015-0013570

(51) Int. Cl.
 *H04L 29/06*  (2006.01)
 *H04L 29/08*  (2006.01)
 *H04L 29/14*  (2006.01)

(52) U.S. Cl.
 CPC ...... *H04L 63/0281* (2013.01); *H04L 63/0272* (2013.01); *H04L 63/20* (2013.01); *H04L 67/141* (2013.01); *H04L 65/1016* (2013.01); *H04L 65/1073* (2013.01); *H04L 69/40* (2013.01)

(58) Field of Classification Search
 CPC . H04L 63/0281; H04L 63/0272; H04L 63/20; H04L 67/141; H04L 69/40; H04L 65/1073; H04L 65/1016
 See application file for complete search history.

(56) References Cited

U.S. PATENT DOCUMENTS

| 8,150,393 | B2 * | 4/2012 | Mayer ............... H04L 69/40 455/435.1 |
| 2002/0157024 | A1 | 10/2002 | Yokote |

(Continued)

FOREIGN PATENT DOCUMENTS

| KR | 10-2010-0000976 A | 1/2010 | |
| WO | WO-2009094852 A1 * | 8/2009 | ......... H04L 65/1016 |

OTHER PUBLICATIONS

3GPP TS 24.228, V5.15.0; Valbonne, France; Sep. 2006.

(Continued)

*Primary Examiner* — Matthew T Henning
(74) *Attorney, Agent, or Firm* — Jefferson IP Law, LLP

(57) ABSTRACT

Management of a Security Association (SA) between an Internet protocol Multimedia Subsystem (IMS) and a terminal in a communication system. A method of operating a Proxy-Call Session Control Function (P-CSCF) device includes determining a need to establish an SA due to a loss of SA information of a terminal, and transmitting a message for informing the loss of the SA information.

9 Claims, 19 Drawing Sheets

(56) References Cited

U.S. PATENT DOCUMENTS

| | | | | |
|---|---|---|---|---|
| 2003/0154400 | A1* | 8/2003 | Pirttimaa | H04L 29/06 |
| | | | | 726/14 |
| 2003/0159067 | A1* | 8/2003 | Stirbu | H04L 63/101 |
| | | | | 726/8 |
| 2004/0117657 | A1* | 6/2004 | Gabor | H04L 63/0428 |
| | | | | 726/4 |
| 2006/0078120 | A1* | 4/2006 | Mahendran | H04L 63/0428 |
| | | | | 380/255 |
| 2008/0005300 | A1* | 1/2008 | Grayson | H04L 63/164 |
| | | | | 709/223 |
| 2008/0069050 | A1 | 3/2008 | Dutta et al. | |
| 2008/0072310 | A1 | 3/2008 | Dutta et al. | |
| 2008/0182575 | A1 | 7/2008 | Torres et al. | |
| 2009/0328191 | A1 | 12/2009 | Choi et al. | |
| 2010/0150137 | A1 | 6/2010 | Lu et al. | |
| 2010/0235620 | A1* | 9/2010 | Nylander | H04L 63/205 |
| | | | | 713/151 |
| 2012/0044802 | A1 | 2/2012 | Gu et al. | |
| 2013/0194910 | A1 | 8/2013 | Przybysz et al. | |
| 2016/0380802 | A1* | 12/2016 | Kunz | H04W 76/19 |
| | | | | 370/216 |

OTHER PUBLICATIONS

3GPP TS 33.203, V12.7.0; Valbonne, France; Sep. 2014.
3GPP TS 23.228, V13.0.0; Valbonne, France; Sep. 2014.
Korean Notice of Patent Grant dated Jan. 20, 2021, issued in Korean Application No. 10-2015-0013570.

* cited by examiner

DEVICE AND METHOD FOR ESTABLISHING SECURITY ASSOCIATION IN COMMUNICATION SYSTEM

CROSS-REFERENCE TO RELATED APPLICATION(S)

This application is a U.S. National Stage application under 35 U.S.C. § 371 of an International application filed on Jan. 27, 2016 and assigned application number PCT/KR2016/000879, which claimed the benefit of a Korean patent application filed on Jan. 28, 2015 in the Korean Intellectual Property Office and assigned Serial number 10-2015-0013570, the entire disclosure of which is hereby incorporated by reference.

FIELD OF THE INVENTION

The present invention relates to a management of a Security Association (SA) in a communication system.

BACKGROUND

In the past, a telephony service of a mobile communication system was provided through a Public Switched Telephone Network (PSTN). However, due to the advance in communication technologies, a broadband mobile data communication service has recently been available, and thus an Internet phone based on data communication, that is, a Voice over Internet Protocol (VoIP) service is provided. Accordingly, a user can use a VoIP call through an access network which provides an IP connectivity.

An IP Multimedia Subsystem (IMS) is used to provide the VoIP service. The IMS is a system for providing a multimedia service such as voice, audio, video, data, or the like based on an IP, and is operated independently of the access network. The IMS provides its own IP access security function to ensure a certain level of security. For example, messages exchanged between a terminal and an IMS network to control the telephony service (e.g., to receive and transmit a voice/video call) are delivered through a Security Association (SA) based on an IP security (IPsec: IP security protocol). The IPsec is a set of security protocols and algorithms, and is for protecting IP data in a network layer. Accordingly, the messages may be subjected to an encryption process and a modulation prevention process.

As described above, the IMS network supports a robust security function. However, communication between the terminal and the IMS network cannot be achieved when security information regarding the SA is lost due to a malfunction, a failure, or the like of the terminal or the system. In this case, a call to the terminal may be lost. Furthermore, recently, since a function of a user device (e.g., a smart phone) has been diversified and complicated and multi-processing has been more frequently performed, a risk of losing the security information is increasing due to various error conditions (e.g., a process abort, a memory error) which may occur in the user device.

DETAILED DESCRIPTION OF THE INVENTION

Technological Problem

An exemplary embodiment of the present invention provides an apparatus and method for managing a Security Association (SA) in a communication system.

Another exemplary embodiment of the present invention provides an apparatus and method for solving a problem caused by a loss of security information in a communication system.

Another exemplary embodiment of the present invention provides an apparatus and method for recognizing a loss of security information in a communication system.

Another exemplary embodiment of the present invention provides an apparatus and method for notifying a loss of security information to a terminal in a communication system.

Another exemplary embodiment of the present invention provides an apparatus and method for re-registering to an Internal protocol Multimedia Subsystem (IMS) when security information is lost in a communication system.

Means for Solving Problem

According to one exemplary embodiment of the present invention, a method of operating a Proxy-Call Session Control Function (P-CSCF) device of an IMS in a communication system includes determining a need to establish an SA due to a loss of SA information of a terminal, and transmitting a message for informing the loss of the SA information.

According to one exemplary embodiment of the present invention, a method of operating a Serving-Call Session Control Function (S-CSCF) device of an IMS in a communication system includes determining a loss of SA information of a terminal, and transmitting a message for informing a need to establish an SA for the terminal.

According to one exemplary embodiment of the present invention, a method of operating a Policy and Charging Rules Function (PCRF) device of an IMS in a communication system includes receiving a first message for informing a loss of SA information of a terminal, and transmitting a second message for informing the loss of the SA information to a gateway corresponding to the terminal.

According to one exemplary embodiment of the present invention, a method of operating a gateway in a communication system includes receiving a first message for informing a loss of SA information of a terminal from an IMS, and transmitting a second message for inducing establishment of an SA to the terminal.

According to one exemplary embodiment of the present invention, a method of operating a terminal in a communication system includes receiving a message for informing a loss of SA information of a terminal, and performing a procedure for establishing the SA.

According to one exemplary embodiment of the present invention, a P-CSCF device of an IMS in a communication system includes a controller for determining a need to establish an SA due to a loss of SA information of a terminal, and a transmitter for transmitting a message for informing the loss of the SA information.

According to one exemplary embodiment of the present invention, an S-CSCF device of an IMS in a communication system includes a controller for determining a loss of SA information of a terminal, and a transmitter for transmitting a message for informing a need to establish an SA for the terminal.

According to one exemplary embodiment of the present invention, a PCFR device of an IMS in a communication system includes a receiver for receiving a first message for informing a loss of SA information of a terminal, and a transmitter for transmitting a second message for informing the loss of the SA information to a gateway corresponding to the terminal.

According to one exemplary embodiment of the present invention, a gateway device in a communication system includes a receiver for receiving a first message for informing a loss of SA information of a terminal from an IMS, and a transmitter for transmitting a second message for inducing establishment of an SA to the terminal.

According to one exemplary embodiment of the present invention, a terminal device in a communication system includes a receiver for receiving a message for informing a loss of SA information of a terminal, and a controller for performing a procedure for establishing the SA.

Effects of the Invention

Since an information loss for a Security Association (SA) is detected and the SA is reconfigured in a communication system, a Voice over Internal Protocol (VoIP) service can be smoothly provided.

DETAILED DESCRIPTION OF EXEMPLARY EMBODIMENTS

The present invention will be described herein below with reference to the accompanying drawings. In the following description, well-known functions or constructions are not described in detail since they would obscure the invention in unnecessary detail. In addition, since the terms used herein are defined according to the functions of the present invention, the terms may vary depending on user's or operator's intension and usage. Therefore, the terms used herein must be understood based on the descriptions made herein.

Hereinafter, the present invention describes a technique for managing a Security Association (SA) in a communication system.

In the following description, terms referring to network entities, connection states, data and information items, or the like are exemplified for convenience of explanation. Therefore, the present invention is not limited to terms described below, and other terms having identical technical meanings may also be used.

Hereinafter, the term '... unit', '... device', or the like implies a unit of processing at least one function or operation, and may be implemented in hardware or software or in combination of the hardware and the software.

For convenience of explanation, some terms and names defined in a 3$^{rd}$ Generation Partnership Project (3GPP) standard may be used in the present invention. However, the present invention is not limited to the above terms and names, and thus may also be equally applied to a system conforming to another standard.

Figure 1:
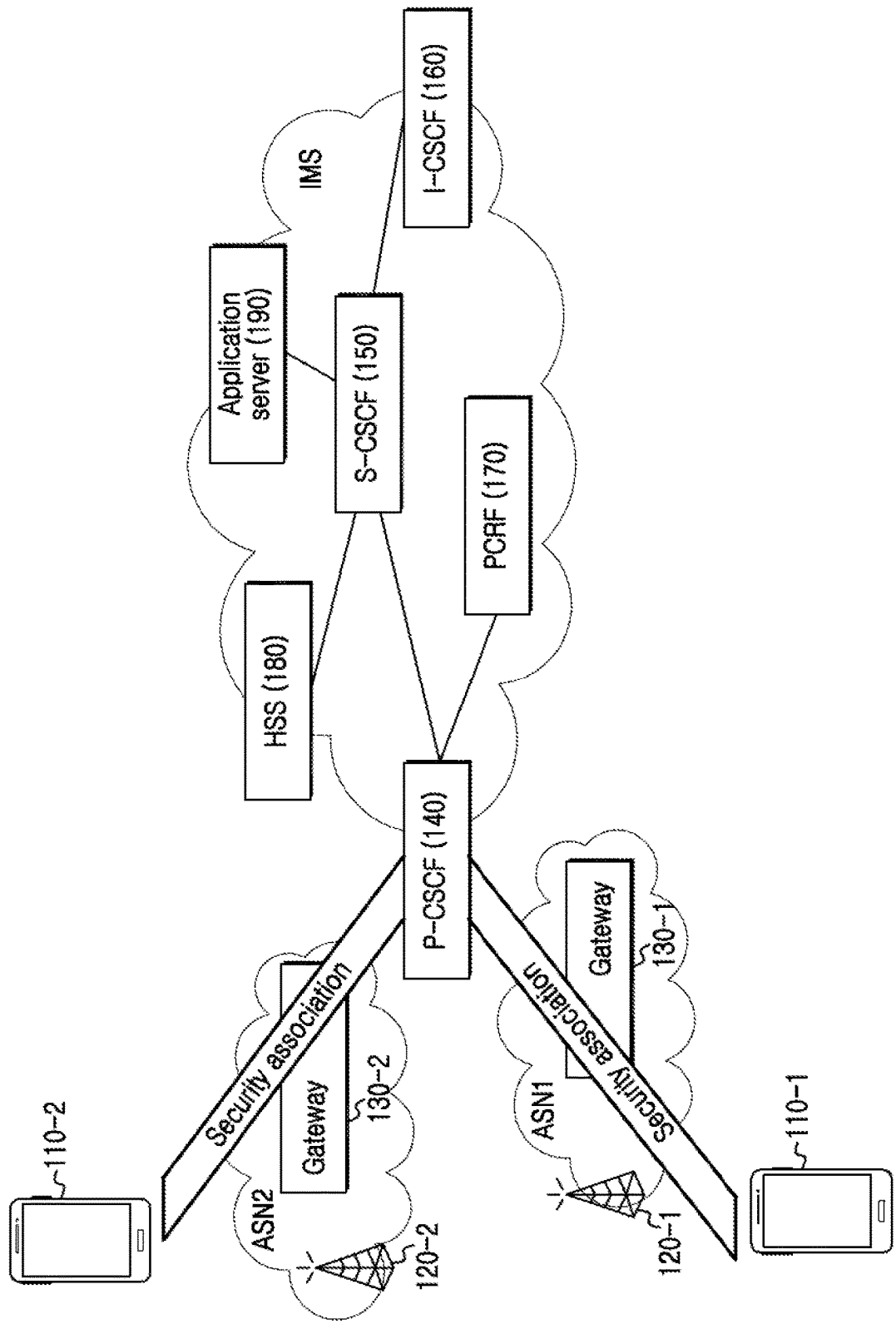
FIG. 1 is a schematic view of a communication system according to an exemplary embodiment of the present invention.

FIG. 1 is a schematic view of a communication system according to an exemplary embodiment of the present invention.

Referring to FIG. 1, a terminal 110-1 and a terminal 110-2 are attached to an Internal protocol Multimedia Subsystem (IMS) respectively through an Access Service Network (ASN) 1 and an ASN 2. The terminal 110-1 and the terminal 110-2 are user equipments. The terminal 110-1 and the terminal 110-2 have a communication function, and support data communication. For example, the terminal 110-1 and the terminal 110-2 may be portable electronic devices, and may be one of a smart phone, a portable terminal, a mobile phone, a mobile pad, a tablet computer, a handheld computer, and a Personal Digital Assistant (PDA). In addition, the electronic device may be a device which is a combination of two or more functions of the aforementioned devices.

The ASN1 and the ASN2 provide an Internet Protocol (IP) connectivity to the terminals 110-1 and 110-2. For this, the ASN1 includes a base station 120-1 for communicating with the terminal 110-1 through a wireless channel and a gateway 130-1 for a connection between an external network (e.g., an IMS network) and the ASN1. In addition, the ASN2 includes a base station 120-2 for communicating with the terminal 110-2 and a gateway 130-2 for a connection between the external network (e.g., the IMS network) and the ASN2. The gateway 130-1 and the gateway 130-2 process bearer traffic of the terminals 110-1 and 110-2. The ASN1 and the ASN2 are used as a transport plane, so that the terminal 110-1 and the terminal 110-2 can be attached to the IMS network. Accordingly, the gateways 130-1 and 130-2 process the bearer traffic on the basis of a processing policy (limitation on a block, a bandwidth, etc.) regarding bearer traffic received from a Policy and Charging Rules Function (PCRF) server 170.

The ASN1 and the ASN2 may be configured by identical or different communication protocols. For example, in the ASN1, a communication duration may conform to a Long Term Evolution (LTE) protocol and a data communication duration may conform to an Evolved Packet Core (EPC) protocol. In this case, the base station 120-1 may be referred to as a node B (NB) or an evolved-NB (eNB), and the gateway 130-2 may be referred to as a Packet data network Gateway (P-GW). In addition, the ASN2 may conform to a $2^{nd}$ Generation (2G)/$3^{rd}$ Generation (3G) Packet Switched (PS) protocol. In this case, the base station 120-2 may be referred to as a Base Transceiver Station (BTS), and the gateway 130-2 may be referred to as a Gateway GPRS Support Node (GGSN).

The IMS network is a system for providing a multimedia service such as voice, audio, video, data, or the like on the basis of an IP. The IMS network includes a Proxy-Call Session Control Function (P-CSCF) server 140, a Serving-Call Session Control Function (S-CSCF) server 150, an Interrogating-Call Session Control Function (I-CSCF) server 160, the PCRF server 170, a Home Subscriber Server (HSS) 180, and an application server 190.

The P-CSCF server 140 is a network entity which serves as a gateway of the IMS network from a perspective of a user. The terminals 110-1 and 110-2 may use a service of the IMS network by performing Session Initiation Protocol (SIP) signaling with respect to the P-CSCF server 140. To ensure security for the SIP signaling, the terminals 110-1 and 110-2 and the P-CSCF server 140 may establish a security association. The security association is for protecting signaling between the terminals 110-1 and 110-2 and the P-CSCF server 140, and is related to agreement on shared keys and determination on a set of parameters specific to a protection method. Herein, the security association may be based on an IP security (IPsec). The security association is established during an IMS registration procedure of the terminal 110-1 or the terminal 110-2, and is maintained until a corresponding terminal (e.g., the terminal 110-1 or the terminal 110-2) is de-registered. In addition, the P-CSCF server 140 may interwork with the PCRF server 170 to reserve a resource of a data duration of the ASN1 or ASN2 used to transmit IMS bearer traffic.

The S-CSCF server 150 manages a state of sessions related to the IMS network, and processes functions for call processing on the basis of the interworking with the HSS 180. In addition, the S-CSCF server 150 controls a registration procedure for the IMS network of the terminals 110-1 and 110-2. Further, the S-CSCF server 150 may perform functions such as security association maintenance, user authentication, authorization verification of a bearer resource, Quality of Service (QoS) management, or the like.

The I-CSCF server 160 serves as a contact point for all calls to a subscriber in the network, and serves as a contact point for a subscriber of another network when roaming into the network. In addition, the I-CSCF server 160 may deliver an SIP message to the S-CSCF server 150, and may generate billing information. When a plurality of HSSs and a plurality of S-CSCFs are included in the IMS network, the I-CSCF server 160 selects one HSS when registering the terminal 110-1 or the terminal 110-2, and assigns the S-CSCF for a registration procedure.

In FIG. 1, the P-CSCF server 140, the S-CSCF server 150, and the I-CSCF server 160 are described as independent network entities. However, according to another exemplary embodiment of the present invention, the P-CSCF server 140, the S-CSCF server 150, and the I-CSCF server 160 may be implemented as one device. In this case, in the device, the P-CSCF server 140, the S-CSCF server 150, and the I-CSCF server 160 may be implemented as physically separated constitutional elements, or may be implemented without physical distinction. In this case, data and messages transmitted and received among the P-CSCF server 140, the S-CSCF server 150, and the I-CSCF server 160 may be processed by a signal exchange in the device.

The PCRF server 170 determines a resource usage policy for a data duration of the radio access network, that is, the ASN1 and the ASN2, and controls a Policy and Charging Enforcement Function (PCEF) (e.g., the gateways 130-1 and 130-2) according to the determined policy. For the IMS service, the P-CSCF server 140 delivers service-related information to the PCRF server 170. The PCRF server 170 may determine a resource usage policy of the radio access network on the basis of information provided from the P-CSCF server 140 and subscriber information received from a Subscriber Profile Repository (SPR).

The HSS 180 manages mobility of the user, and generates security information for the user. In addition, the HSS 180 may generate data for supporting user authentication, message integrity verification, and encryption functions. The HSS 180 may determine whether roaming of the terminals 110-1 and 110-2 is possible, and may perform an authorization verification function for a network access.

The application server 190 processes a service provided in the IMS network. For example, the service may include a voice call, a video telephony, a messaging service, or the like. At least one application server other than the application server 190 may be further included in the IMS network.

According to various exemplary embodiments of the present invention, the P-CSCF server 140 may provide control such that a loss of information on a security association is notified to the terminals 110-1 and 110-2 on the basis of interworking with the PCRF server 170. The information on the security association may include a key value, an encryption algorithm, an integrity algorithm, a packet sequence number, a hash value, or the like. The loss of the information on the security association may occur in the terminals 110-1 and 110-2 or in the P-CSCF server 140. For example, when the security association information is lost in the terminal 110-1, the P-CSCF server 140 which has recognized the loss of the information on the security association notifies the PCRF server 170 of the loss of the security association information. When the P-CSCF server 140 receives the notification regarding the loss of the information on the security association, the PCRF server 170 confirms a corresponding terminal, that is, the gateway 130-1 to which the terminal 110-1 is attached, and transmits the notification to the gateway 130-1. Accordingly, the notification is delivered to the gateway 130-1, and the gateway 130-1 transmits the notification to the terminal 110-1. The notification may be referred to as a P-CSCF failure indication.

In the case of FIG. 1, the terminals 110-1 and 110-2 may be attached to the IMS network via the ASN1 and the ASN2. That is, the terminals 110-1 and 110-2 perform IP communication based on wireless communication. However, according to another exemplary embodiment of the present invention, the communication system may further include at least one different terminal for performing IP communication based on wired communication. In this case, the different terminal may be attached to the IP network through the wired network, not the ASN1 or the ASN2, and may be attached to the IMS network.

Hereinafter, the present invention describes various exemplary embodiments of a procedure for re-establishing a security association due to a loss of information on the security association. For convenience of explanation, the 'information on the security association' is referred to as 'security association information'.

Figure 2:
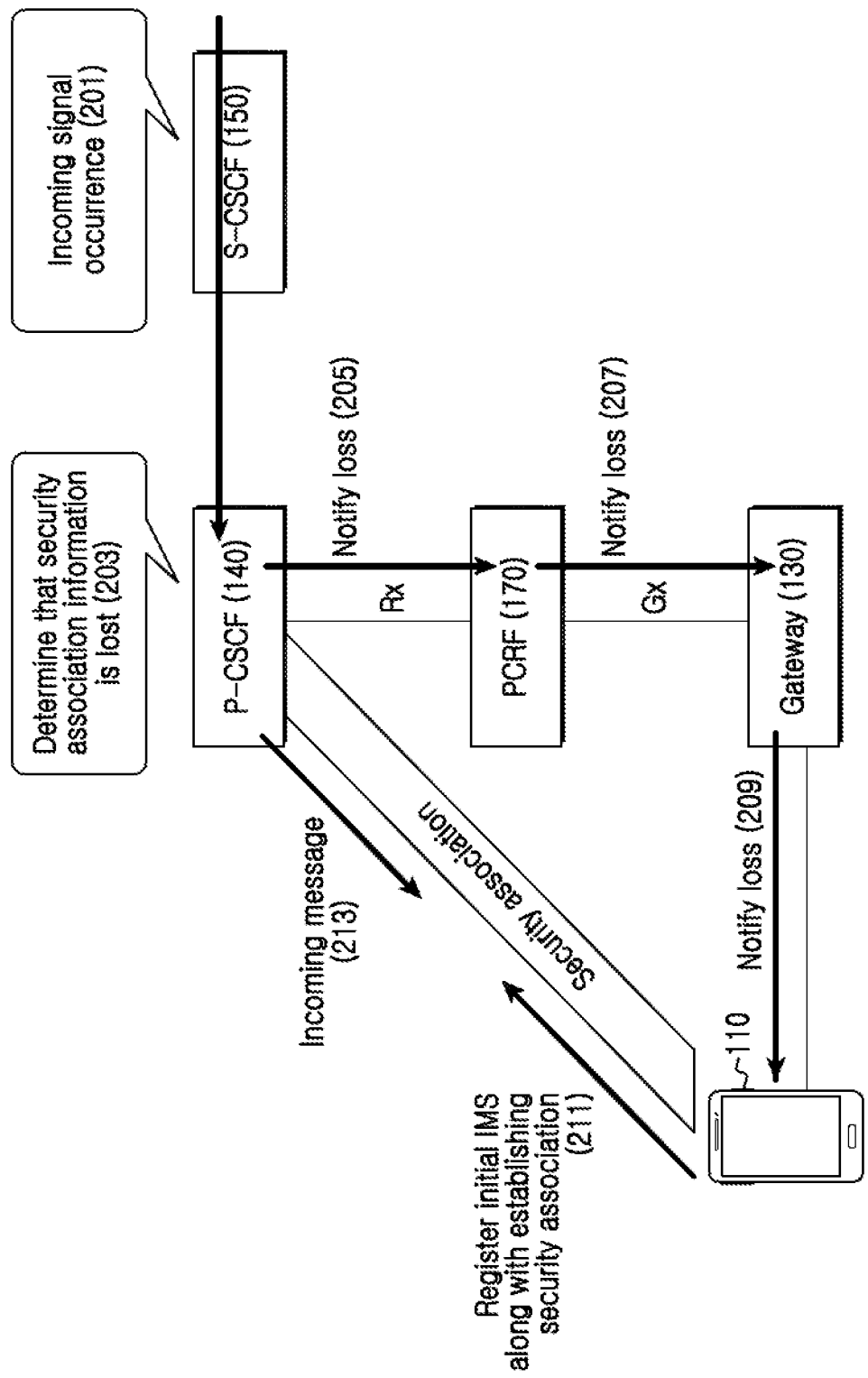
FIG. 2 illustrates a procedure of processing a security association when security information is lost in a communication system according to an exemplary embodiment of the present invention.

FIG. 2 illustrates a procedure of processing a security association when security information is lost in a communication system according to an exemplary embodiment of the present invention. A case where the P-CSCF server 140 recognizes that the terminal 110 has lost security association information is exemplified in FIG. 2.

Referring to FIG. 2, in step 201, an incoming call to the terminal 110 is generated. The S-CSCF server 150 receives a message for requesting the terminal llo to receive the call, and notifies the P-CSCF server 140 of the generation of the incoming call.

In step 203, the P-CSCF server 140 recognizes that the security association information of the terminal 110 is lost. When the incoming call is generated, the P-CSCF server 140 attempts to establish the incoming call by transmitting a session setup request to the terminal 110 of a corresponding subscriber. For example, the session setup request may include an INVITE request defined in an SIP. The request is transmitted through a security association established between the P-CSCF server 140 and the terminal 110. In other words, the request is encrypted depending on a key value determined by the security association. The loss of the security association information may be recognized when a response to the request is not received within a certain time. For example, the response may include an INVITE response defined in the SIP. For example, the P-CSCF server 140 starts a timer for the response by transmitting the INVITE request. If the response is not received until the timer expires, the P-CSCF server 140 retransmits the request and restarts the timer. However, if the response is not received until the timer expires, the P-CSCF server 140 treats the incoming call as a failure. In this case, the P-CSCF server 140 determines that the terminal 110 has lost the security association information. That is, the P-CSCF server 140 determines the loss of the security association information when the timer expires two times. However, according to another exemplary embodiment of the present invention, the P-CSCF server 140 may determine the loss of the security association information when the timer expires one time.

In step 205, the P-CSCF server 140 determines the loss of the security association information according to the expiry of the timer, and thereafter transmits a notification of the loss of the security association information to the PCRF server 170. In this case, the incoming call is managed in a pending state. The notification may be delivered through an Rx interface between the P-CSCF server 140 and the PCRF server 170. The notification includes at least one of an indication for informing the loss of the security association information and information regarding the terminal 110. The information regarding the terminal 110 may include an IP address of the terminal 110.

In step 207, the PCRF server 170 delivers the notification of the security association information loss to the gateway 130. Upon receiving the notification of the security association information loss from the P-CSCF server 140, the PCRF server 170 confirms the terminal 110 which has established the lost security association. For example, the PCRF server 170 may confirm the terminal 110 by using an IP address of the terminal 110, included in the notification. In addition, the PCRF server 170 confirms the gateway 130 of a radio access network to which the terminal 110 is attached. For this, the PCRF server 170 may use information stored in the HSS 180. In addition, the PCRF server 170 transmits the notification to the gateway 130. In this case, the notification may be delivered through a Gx interface.

In step 209, the gateway 130 transmits the notification of the security association information loss to the terminal 110. That is, the gateway 130, which has received the notification of the security association information loss of the terminal 110 from the PCRF server 170, informs the terminal 110 of the security association information loss. Herein, according to one exemplary embodiment of the present invention, the notification delivered from the gateway 130 to the terminal 110 may be a message defined to inform the loss of the security association information. According to another exemplary embodiment of the present invention, the notification delivered from the gateway 130 to the terminal 110 may be replaced with a re-attach request. That is, the gateway 130 may transmit a message defined to inform the security association information loss, or may provide the re-attach request to the terminal 110.

In step 211, the terminal 110 establishes a new security association. Upon receiving the notification from the gateway 130, the terminal 110 establishes the security association by performing an initial registration procedure with respect to the IMS network. The terminal 110 may perform the registration procedure similarly to a case of being initially attached to the IMS network. Accordingly, the new security association for the terminal 110 is established. The registration procedure and the security association establishment procedure will be described below in detail with reference to FIG. 3 and FIG. 4.

In step 213, the P-CSCF server 140 transmits an incoming message to the terminal 110. For example, the P-CSCF server 140 transmits to the terminal 110 a message for requesting a creation of a session for the incoming call. That is, the P-CSCF server 140 manages the incoming call in the pending state after the step 203, and informs the terminal 110 of the generation of the incoming call after the new security association is established.

Figure 3:
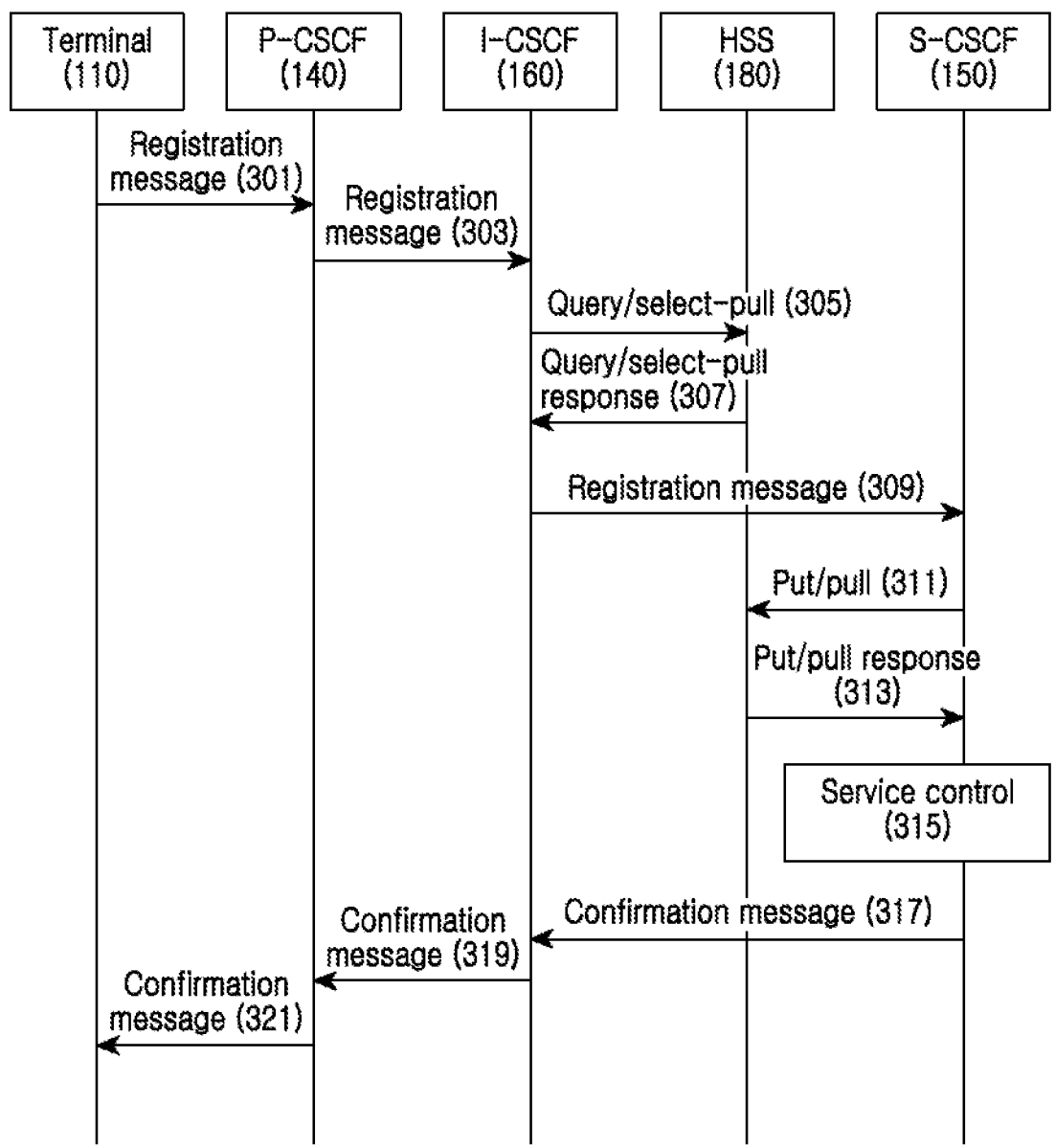
FIG. 3 illustrates signaling for registering an Internet protocol Multimedia Subsystem (IMS) network in a communication system according to an exemplary embodiment of the present invention.

FIG. 3 illustrates signaling for registering an IMS network in a communication system according to an exemplary embodiment of the present invention. A signal exchange among the terminal 110, the P-CSCF server 140, the I-CSCF server 160, the HSS 180, and the S-CSCF server 150 for IMS network registration of the terminal 110 is exemplified in FIG. 3. The registration procedure exemplified in FIG. 3 may be triggered by a notification of a loss of the security association information to the terminal 110 or by a re-attach of the terminal 110.

Referring to FIG. 3, in step 301, the terminal 110 transmits a registration message to the P-CSCF server 140. Herein, the registration message may include a user identity, a home network domain name, an IP address of the terminal 110, an instance IDentifier (ID), or the like.

In step 303, the P-CSCF server 140 transmits the registration message to the I-CSCF server 160. The P-CSCF server 140 may discover an entry point (e.g., the I-CSCF server 160) of a home network by using a home network domain name included in the registration message received from the terminal 110.

In step 305, the I-CSCF server 160 transmits a query/select-pull message to the HSS 180. The query/select-pull message is transmitted to confirm the S-CSCF server 150 corresponding to the terminal 110. The query/select-pull message may include information regarding the terminal 110 (e.g., user identification information, etc.) and information regarding the P-CSCF server 140 (e.g., a network ID). Accordingly, the HSS 180 determines whether the registration of the terminal 110 is permitted in the network of the P-CSCF server 140, and confirms and stores a correspondence relationship between the terminal 110 and the P-CSCF server 140.

In step 307, the HSS 180 transmits a query/select-pull response message to the I-CSCF server 160. In this case, the HSS 180 confirms the S-CSCF server 150 corresponding to the terminal 110. Accordingly, the query/select-pull response message may include at least one of a name of the S-CSCF server 150 and capability of the S-CSCF server 150.

In step 309, the I-CSCF server 160 transmits the registration message to the S-CSCF server 150. That is, the I-CSCF server 160 may confirm an address of the S-CSCF server 150 by using the name of the S-CSCF server 150, and may transmit the registration message. The registration message may include at least one of the name and address of the P-CSCF server 140, the user identification information, the network ID of the P-CSCF server 140, and the IP address of the terminal 110.

In step 311, the S-CSCF server 150 transmits a put/pull message to the HSS 180. For example, the S-CSCF server 150 determines whether registration of the terminal 110 is permitted. In addition, if the registration of the terminal 110 is permitted, the S-CSCF server 150 also transmits the put/pull message to the HSS 180. The put/pull message may include at least one of the information regarding the terminal 110 (e.g., user identification information, etc) and the information regarding the S-CSCF server 150 (e.g., the name of the S-CSCF server 150).

In step 313, the HSS 180 transmits a put/pull response message to the S-CSCF server 150. That is, upon receiving the put/pull message, the HSS 180 confirms and stores a corresponding relationship between the terminal 110 and the S-CSCF 160. In addition, the HSS 180 transmits the put/pull response message. The put/pull response message may include at least one of name/address information to access a platform used for a service control while the terminal 110 is registered in the S-CSCF server 150.

In step 315, the S-CSCF server 150 performs a service control. For this, the S-CSCF server 150 may transmit information regarding the registration of the terminal 110 to the platform.

In step 317 to step 321, a confirmation message is delivered from the S-CSCF server 150 to the terminal 110 via the I-CSCF server 160 and the P-CSCF server 140. The confirmation message may include home network contact information.

Figure 4:
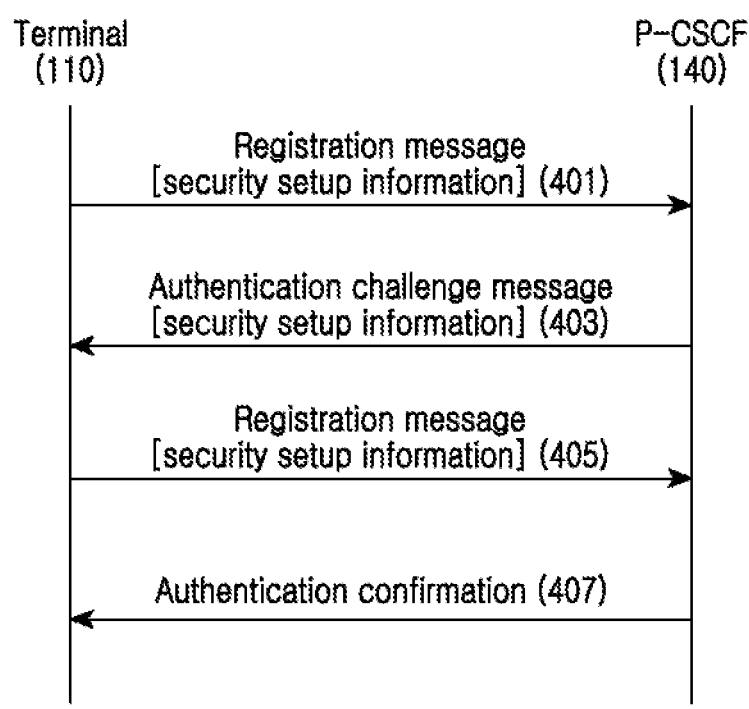
FIG. 4 illustrates signaling for establishing a security association in a communication system according to an exemplary embodiment of the present invention.

FIG. 4 illustrates signaling for establishing a security association in a communication system according to an exemplary embodiment of the present invention. A signal exchange between the terminal 110 and the P-CSCF server 140 for the security association is exemplified in FIG. 4.

Referring to FIG. 4, in step 401, to establish a new security association, the terminal 110 transmits a registration message including information for a security association between the terminal 110 and the P-CSCF server 140. For example, as security setup information, the registration message may include at least one of a Security Parameter Index (SPI) value, information on protected ports, identification information of an integrity algorithm, and identification of an encryption algorithm.

In step 403, the P-CSCF server 140 transmits an authentication challenge message including information on the security association to the terminal 110. As the security setup information, the authentication challenge message may include at least one of the security parameter index value, information on the security ports, identification information on the integrity algorithm, identification information of the encryption algorithm, or the like allocated by the P-CSCF server 140.

In step 405, the terminal 110 transmits a registration message including information on the security association to the P-CSCF server 140. That is, after receiving the authentication challenge message, the terminal 110 selects one integrity and encryption algorithm combination and transmits a message for informing a selection result. As the security setup information, the registration message may include at least one of the security parameter index value, the information on the security ports, the identification information on the integrity algorithm, and the identification information on the encryption algorithm.

In step 407, the P-CSCF server 140 transmits an authentication confirmation message to the terminal 110. The authentication confirmation message may be a 2xx Auto_OK message defined in an SIP. Although not shown in FIG. 4, before transmitting the authentication confirmation message, the P-CSCF server 140 may transmit to the S-CSCF server 150 a registration message for informing that a message received from the terminal 110 is integrity-protected, and may receive a confirmation message from the S-CSCF server 150.

The registration procedure exemplified in FIG. 3 and the secure association establishment procedure exemplified in FIG. 4 may be performed independently, or may be performed as one procedure. If the registration procedure and the security association establishment procedure are performed as one procedure, the step 301 and the step 401 may be performed as one step, and the step 321 and the step 407 may be performed as one step. That is, referring to FIG. 3, the step 301 including the step 401 may be performed, followed by the step 403 and the step 405, and subsequently, the step 303 to the step 319 are performed, followed by the step 321 including the step 407.

Figure 5:
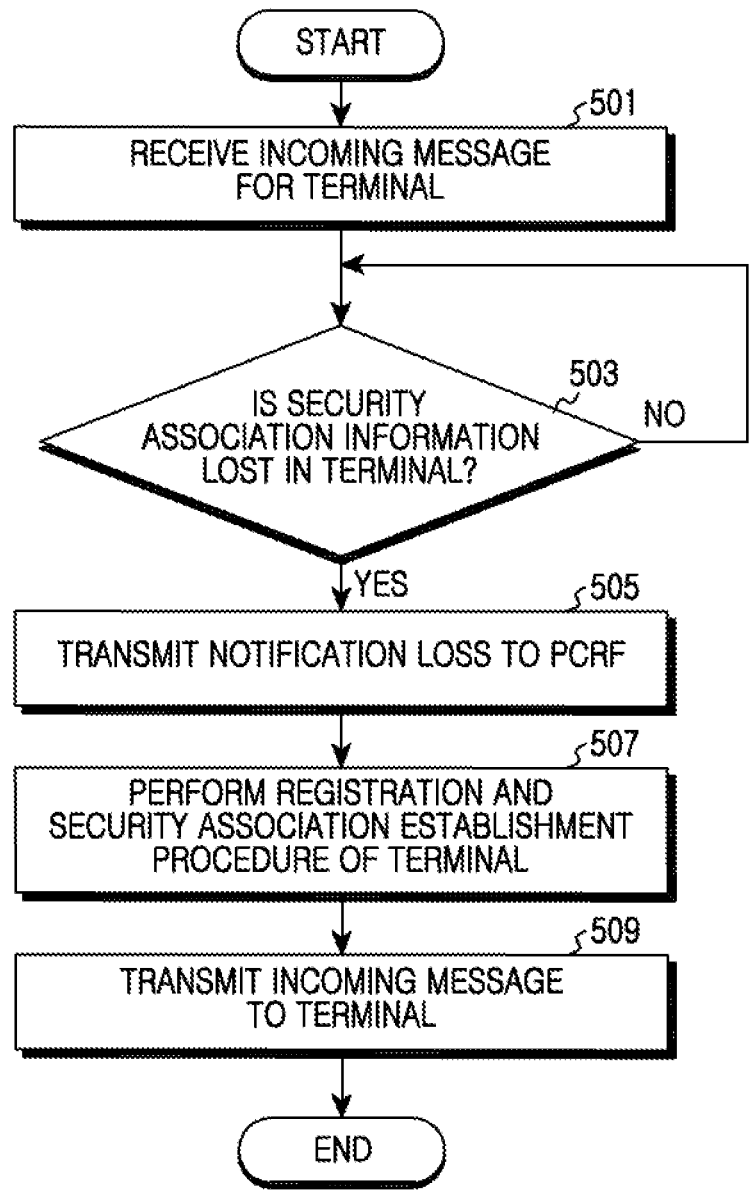
FIG. 5 illustrates a procedure of operating a Proxy-Call Session Control Function (P-CSCF) in a communication system according to an exemplary embodiment of the present invention.

FIG. 5 illustrates a procedure of operating a P-CSCF in a communication system according to an exemplary embodiment of the present invention. A method of operating the P-CSCF server 140 for the procedure of processing a security association of FIG. 2 is exemplified in FIG. 5.

Referring to FIG. 5, in step 501, the P-CSCF server 140 receives an incoming message for the terminal 110. Herein, the incoming message is a message for requesting a session setup. For example, the incoming message may be an INVITE message defined in an SIP.

Subsequently, proceeding to step 503, the P-CSCF server 140 determines whether the security association information is lost in the terminal 110. The loss of the security association information may be determined according to whether there is a response of the terminal 110 with respect to the incoming message. That is, the P-CSCF server 140 transmits the incoming message to the terminal 110 and waits for a response message. If the response message is not received within a predetermined time, the P-CSCF server 140 determines that the security association information is lost.

If the security association information is lost, proceeding to step 505, the P-CSCF server 140 transmits a loss notification to the PCRF server 170. The loss notification includes at least one of an indicator for informing the loss of the security association information, and information regarding the terminal 110. The information regarding the terminal 110 may include an IP address of the terminal 110.

Subsequently, proceeding to step 507, the P-CSCF server 140 performs the registration and security association establishment procedures for the terminal 110. The registration and security association establishment procedures are initiated by the terminal 110. For this, the P-CSCF server 140 may transmit or receive at least one message including security setup information with respect to the terminal 110. A new security association is established between the P-CSCF server 140 and the terminal 110 through the registration and security association establishment procedures.

Thereafter, proceeding to step 509, the P-CSCF server 140 transmits an incoming message to the terminal 110. The incoming message may be an INVITE request message. That is, the P-CSCF server 140 manages the incoming call in the pending state after the step 203, and informs the terminal 110 of the generation of the incoming call after the new security association is established.

Figure 6:
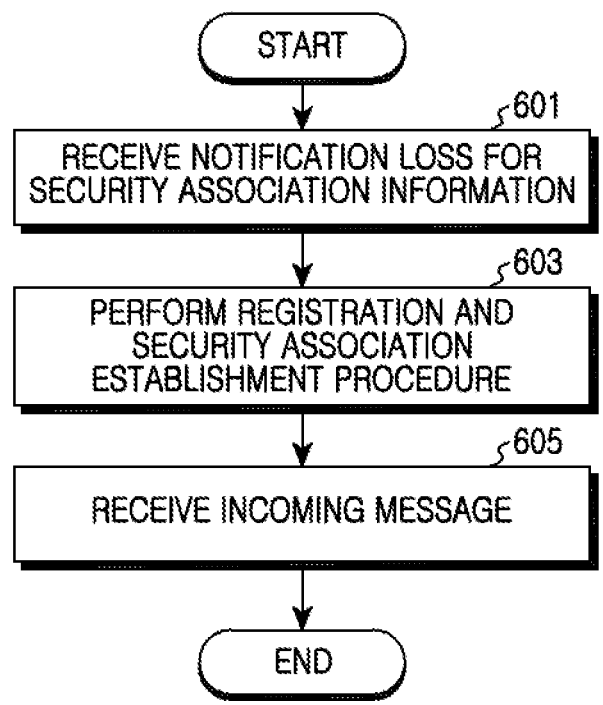
FIG. 6 illustrates a procedure of operating a terminal in a communication system according to an exemplary embodiment of the present invention.

FIG. 6 illustrates a procedure of operating a terminal in a communication system according to an exemplary embodiment of the present invention. A method of operating the terminal 110 for the procedure of processing a security association of FIG. 2 is exemplified in FIG. 6.

Referring to FIG. 6, in step 601, the terminal 110 receives a loss notification for security association information. The loss notification informs that the terminal 110 loses the security association information. The loss notification may be a message defined to inform a loss of the security association information. According to another exemplary embodiment of the present invention, the loss notification may be replaced with a re-attach request.

Thereafter, proceeding to step 603, the terminal 110 performs registration and security association establishment procedures for an IMS network. The registration and security association establishment procedures are initiated by the terminal 110. For this, the terminal 110 may transmit or receive at least one message including security setup information. A new security association is established between the P-CSCF server 140 and the terminal 110 through the registration and security association establishment procedures.

Subsequently, proceeding to step 605, the terminal 110 receives an incoming message from the P-CSCF server 140. Herein, the incoming message is a message for requesting a session setup. For example, the incoming message may be an INVITE message defined in an SIP.

Figure 7:
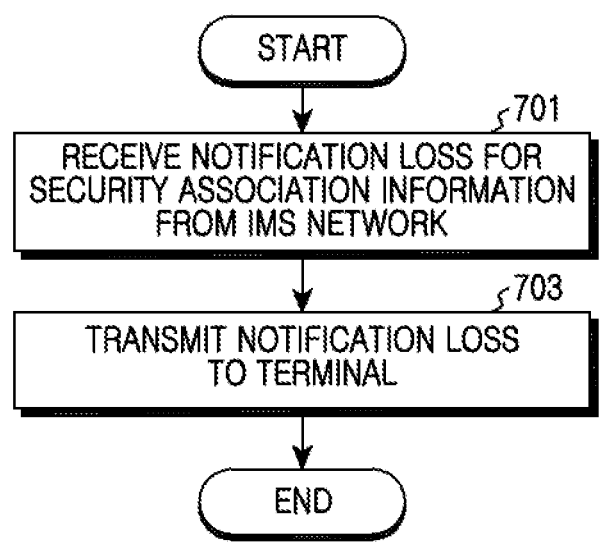
FIG. 7 illustrates a procedure of operating a gateway in a communication system according to an exemplary embodiment of the present invention.

FIG. 7 illustrates a procedure of operating a gateway in a communication system according to an exemplary embodiment of the present invention. A method of operating the gateway 130 for the procedure of processing a security association of FIG. 2 is exemplified in FIG. 7.

Referring to FIG. 7, in step 701, the gateway 130 receives a loss notification for security association information from an IMS network. The loss notification may be received from the PCRF server 170. The loss notification informs that the terminal 110 loses the security association information.

Subsequently, proceeding to step 703, the gateway 130 transmits the loss notification to the terminal 110. Herein, the loss notification may be a message defined to inform a loss of the security association information. According to another exemplary embodiment of the present invention, the loss notification may be replaced with a re-attach request. That is, the gateway 130 transmits to the terminal 110 a message for inducing establishment of the security association.

Figure 8:
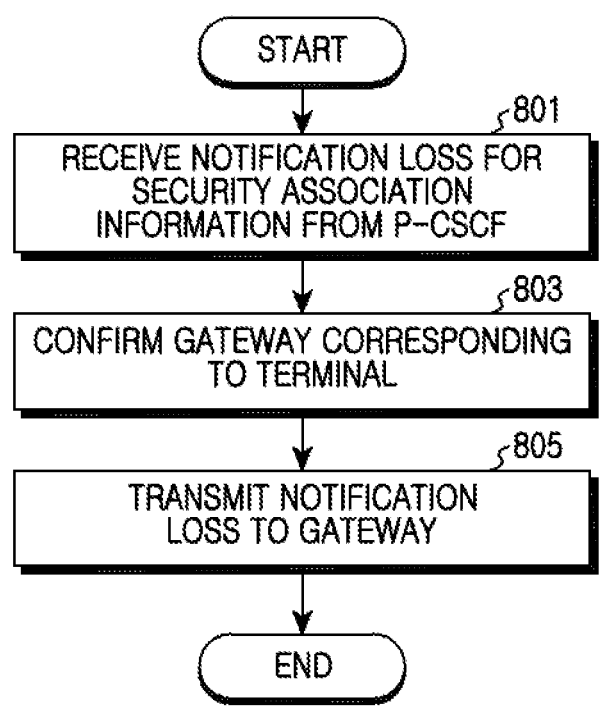
FIG. 8 illustrates a procedure of operating a Policy and Charging Rules Function (PCRF) in a communication system according to an exemplary embodiment of the present invention.

FIG. 8 illustrates a procedure of operating a PCRF in a communication system according to an exemplary embodiment of the present invention. A method of operating the PCRF server 170 for the procedure of processing a security association of FIG. 2 is exemplified in FIG. 8.

Referring to FIG. 8, in step 801, the PCRF server 170 receives a loss notification for security association information from the P-CSCF server 140. The loss notification informs that the terminal 110 loses the security association information. The loss notification includes at least one of an indicator for informing the loss of the security association information, and information regarding the terminal 110. The information regarding the terminal 110 may include an IP address of the terminal 110.

Subsequently, proceeding to step 803, the PCRF server 170 confirms a gateway corresponding to the terminal 110. In other words, the PCRF server 170 confirms the gateway of a radio access network to which the terminal 110 is attached. For example, the PCRF server 170 confirms the terminal 110 by using the IP address of the terminal 110, included in the loss notification, and confirms the gateway 130 of a radio access network to which the terminal 110 is attached. For this, the PCRF server 170 may use information stored in the HSS 180.

Thereafter, proceeding to step 805, the PCRF server 170 transmits the loss notification to the gateway 130. The loss notification informs that the terminal 110 loses the security association information. In addition, the loss notification induces the gateway 130 to notify the terminal 110 of the loss of the security association information.

In the exemplary embodiment of FIG. 2, the P-CSCF server 140 is selected as a P-CSCF for the terminal 110 in the registration procedure of the step 211. However, since an initial registration procedure is performed, another P-CSCF server may be selected other than the P-CSCF server 140. In other words, a new P-CSCF server may be selected in a P-CSCF discovery procedure. For example, if the loss of the security association information is not notified due to a capability limit of the gateway 130 or the terminal 110, another P-CSCF server may be selected other than the P-CSCF server 140 when a re-attach to the terminal 110 is requested. In this case, since the P-CSCF server 140 which has received a message for an incoming call and recognized the loss of the security association information is different from a P-CSCF server which has established a new security association, a situation may occur in which the incoming call in a pending state is not processed. Accordingly, the present invention proposes an exemplary embodiment of FIG. 9.

Figure 9:
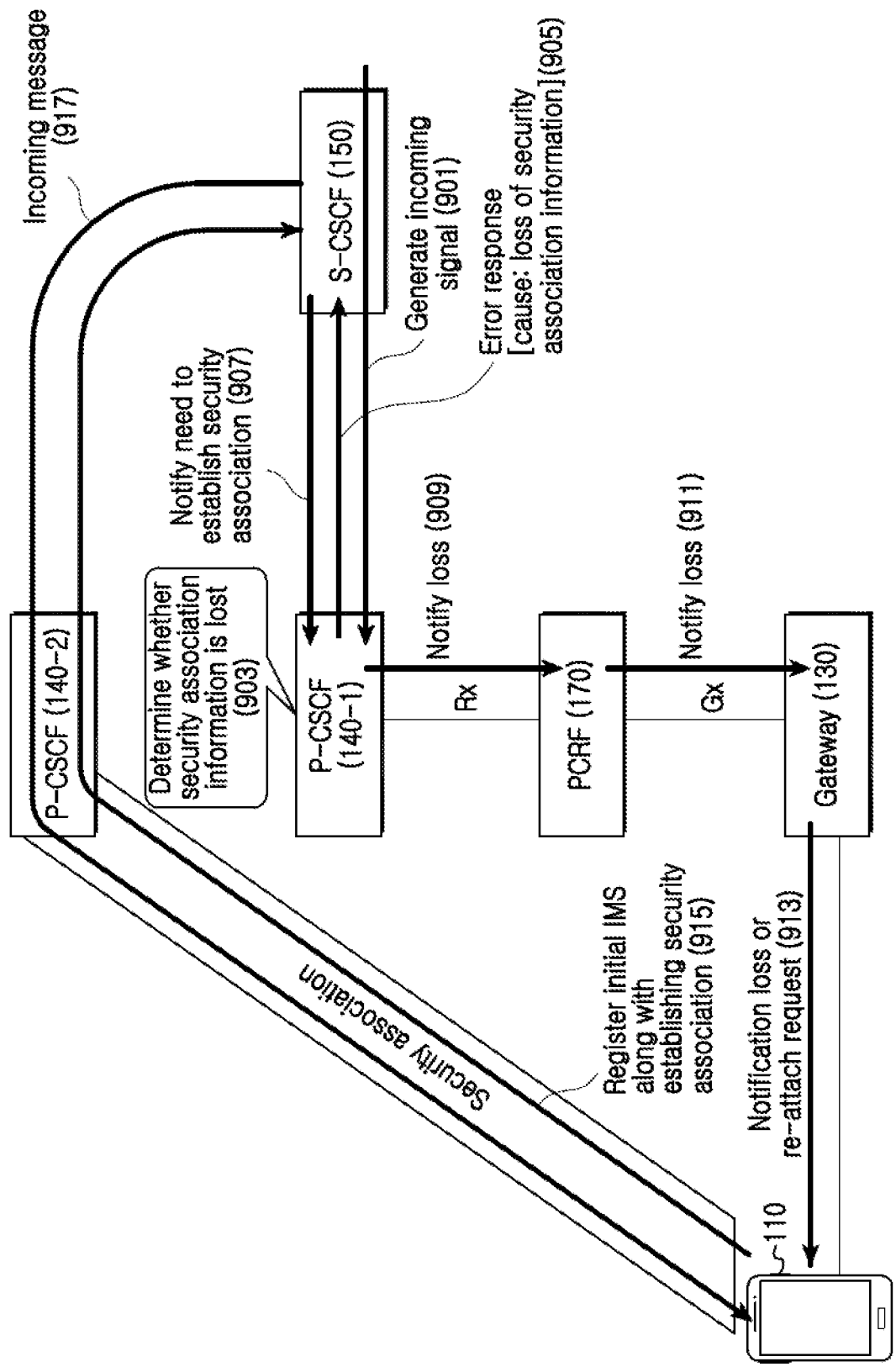
FIG. 9 illustrates a procedure of processing a security association when security information is lost in a communication system according to another exemplary embodiment of the present invention.

FIG. 9 illustrates a procedure of processing a security association when security information is lost in a communication system according to another exemplary embodiment of the present invention. A case where a P-CSCF server 140-1 recognizes that the terminal 110 has lost the security association information, and a P-CSCF server 140-2 newly establishes a security association for the terminal 110 is exemplified in FIG. 9.

Referring to FIG. 9, in step 901, an incoming call to the terminal 110 is generated. The S-CSCF server 150 receives a message for requesting the terminal 110 to receive the call, and notifies the P-CSCF server 140-1 of the generation of the incoming call.

In step 903, the P-CSCF server 140-1 recognizes that the security association information of the terminal 110 is lost. When the incoming call is generated, the P-CSCF server 140 attempts to establish the incoming call by transmitting a session setup request to the terminal 110 of a corresponding subscriber. For example, the session setup request may include an INVITE request defined in an SIP. The request is transmitted through a security association established between the P-CSCF server 140 and the terminal 110. In other words, the request is encrypted depending on a key value determined by the security association. The loss of the security association information may be recognized when a response to the request is not received within a certain time. For example, the response may include an INVITE response defined in the SIP. For example, the P-CSCF server 140 starts a timer for the response by transmitting the INVITE request. If the response is not received until the timer expires, the P-CSCF server 140 retransmits the request and restarts the timer. However, if the response is not received until the timer expires, the P-CSCF server 140 treats the incoming call as a failure. In this case, the P-CSCF server 140 determines that the terminal 110 has lost the security association information. That is, the P-CSCF server 140 determines the loss of the security association information when the timer expires two times. However, according to another exemplary embodiment of the present invention, the P-CSCF server 140 may determine the loss of the security association information when the timer expires one time.

In step 905, upon recognizing the security association information loss with respect to the terminal 110, the P-CSCF server 140 transmits an error response to the S-CSCF server 150. The error response includes at least one of an indicator for informing the loss of the security association information, and information regarding the terminal 110. That is, the P-CSCF server 160 induces the S-CSCF server 150 to control re-establishment of the security association.

In step 907, the S-CSCF server 150 starts an incoming process when the security association information is lost. That is, the S-CSCF server 150 recognize the loss of the security association information due to the error response received from the P-CSCF server 140, and transmits a message for informing a need to establish the security association to the P-CSCF server 140 which has transmitted the error response. The message may be a session setup request message (e.g., an INVITE request) including an indication for informing the need to establish the security association. In this case, the S-CSCF server 150 manages the incoming call in a pending state.

In step 909, the P-CSCF server 140 transmits to the PCRF server 170 the message for informing the need to establish the security association. That is, the P-CSCF server 140 determines whether the message is a message for inducing re-establishment of the security association by confirming an indication for informing the need to establish the security association from the message received from the S-CSCF server 150. The message may be an INVITE request message including the indication. Accordingly, the P-CSCF server 140 transmits a notification of the security association information loss to the PCRF server 170. The notification may be delivered through an Rx interface between the P-CSCF server 140 and the PCRF server 170. The notification includes at least one of an indication for informing the loss of the security association information and information regarding the terminal 110. The information regarding the terminal 110 may include an IP address of the terminal 110.

In step 911, the PCRF server 170 delivers the notification of the security association information loss to the gateway 130. Upon receiving the notification of the security association information loss from the P-CSCF server 140, the PCRF server 170 confirms the terminal 110 which has established the lost security association. For example, the PCRF server 170 may confirm the terminal 110 by using an IP address of the terminal 110, included in the notification. In addition, the PCRF server 170 confirms the gateway 130 of a radio access network to which the terminal 110 is attached. For this, the PCRF server 170 may use information stored in the HSS 180. In addition, the PCRF server 170 transmits the notification to the gateway 130. In this case, the notification may be delivered through a Gx interface.

In step 913, the gateway 130 transmits the notification of the security association information loss to the terminal 110. That is, the gateway 130, which has received the notification of the security association information loss of the terminal 110 from the PCRF server 170, informs the terminal 110 of the security association information loss. Herein, according to one exemplary embodiment of the present invention, the notification delivered from the gateway 130 to the terminal 110 may be a message defined to inform the loss of the security association information. According to another exemplary embodiment of the present invention, the notification delivered from the gateway 130 to the terminal 110 may be replaced with a re-attach request. That is, the gateway 130 may transmit a message defined to inform the security association information loss, or may provide the re-attach request to the terminal 110.

In step 915, the terminal 110 establishes a new security association. Upon receiving the notification from the gateway 130, the terminal 110 establishes the security association by performing an initial registration procedure with respect to the IMS network. The terminal 110 may perform the registration procedure similarly to a case of being initially attached to the IMS network. Accordingly, the new security association for the terminal 110 is established. In this case, the P-CSCF 140-2 is selected as a new P-CSCF. The registration procedure and the security association establishment procedure may be performed as described above with reference to FIG. 3 and FIG. 4. If the re-attach is requested in the step 913, the IP address of the terminal 110 may be newly allocated due to the re-attach.

In step 917, the S-CSCF server 150 transmits the incoming message to the terminal 110 via the P-CSCF 140-2. Even if the terminal 110 performs the registration procedure again, the S-CSCF server 150 is still selected as the S-CSCF for the terminal 110. Therefore, the S-CSCF server 150 may confirm a previous call in a pending state for the terminal 110. Accordingly, upon confirming that the terminal 110 is re-registered, the S-CSCF server 150 may request a session setup for the call in the pending state.

Figure 10:
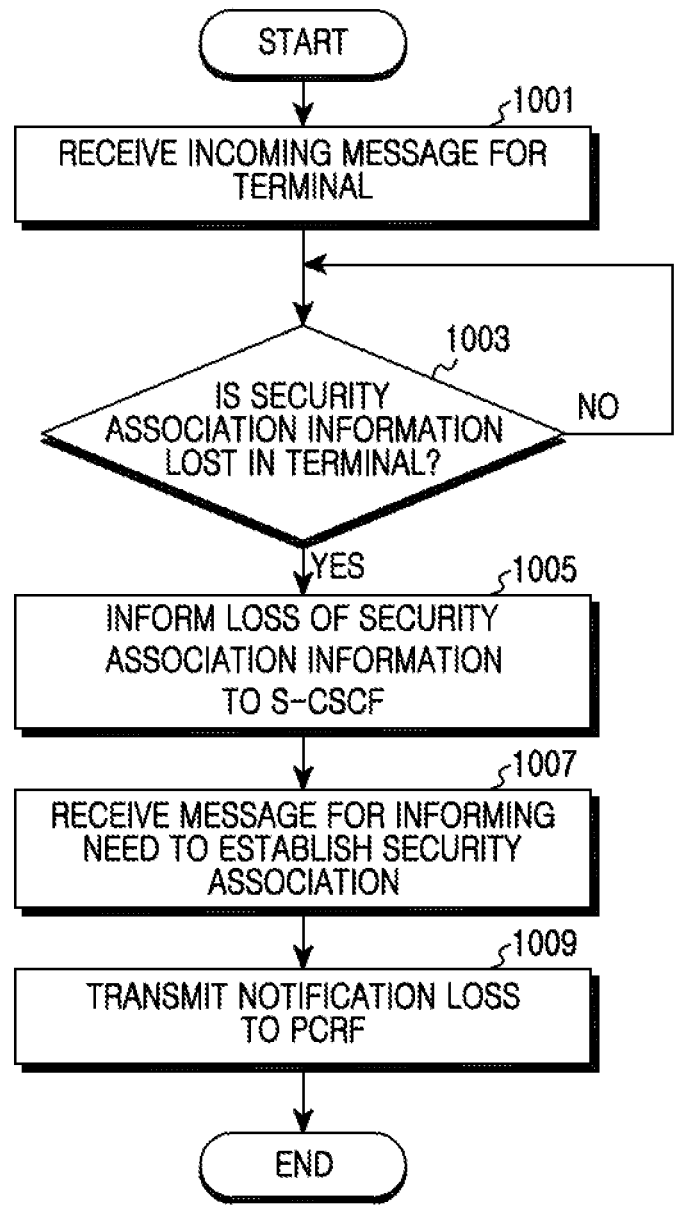
FIG. 10 illustrates a procedure of operating a P-CSCF in a communication system according to another exemplary embodiment of the present invention.

FIG. 10 illustrates a procedure of operating a P-CSCF in a communication system according to another exemplary embodiment of the present invention. A method of operating the P-CSCF server 140 for the procedure of processing a security association of FIG. 9 is exemplified in FIG. 10.

Referring to FIG. 10, in step 1001, the P-CSCF server 140-1 receives an incoming message for the terminal 110.

Herein, the incoming message is a message for requesting a session setup. For example, the incoming message may be an INVITE message defined in an SIP.

Subsequently, proceeding to step 1003, the P-CSCF server 140-1 determines whether the security association information is lost in the terminal 110. The loss of the security association information may be determined according to whether there is a response of the terminal 110 with respect to the incoming message. That is, the P-CSCF server 140-1 transmits the incoming message to the terminal 110 and waits for a response message. If the response message is not received within a predetermined time, the P-CSCF server 140-1 determines that the security association information is lost.

If the security association information is lost, proceeding to step 1005, the P-CSCF server 140-1 informs the S-CSCF server 150 of the loss of the security association information. In other words, the P-CSCF server 140-1 transmits to the S-CSCF server 150 an error response for informing the loss of the security association information. The error response includes at least one of an indicator for informing the loss of the security association information, and information regarding the terminal 110. That is, the P-CSCF server 160 induces the S-CSCF server 150 to control re-establishment of the security association.

Subsequently, proceeding to step 1007, the P-CSCF server 140-1 receives a message for informing the need to establish the security association from the S-CSCF server 150. That is, the P-CSCF server 140-1 determines whether the message is a message for inducing re-establishment of the security association by confirming an indication for informing the need to establish the security association from the message received from the S-CSCF server 150. The message may be an INVITE request message including the indication.

Thereafter, proceeding to step 1009, the P-CSCF server 140-1 transmits a loss notification to the PCRF server 170. The loss notification includes at least one of an indicator for informing the loss of the security association information, and information regarding the terminal 110. The information regarding the terminal 110 may include an IP address of the terminal 110.

Figure 11:
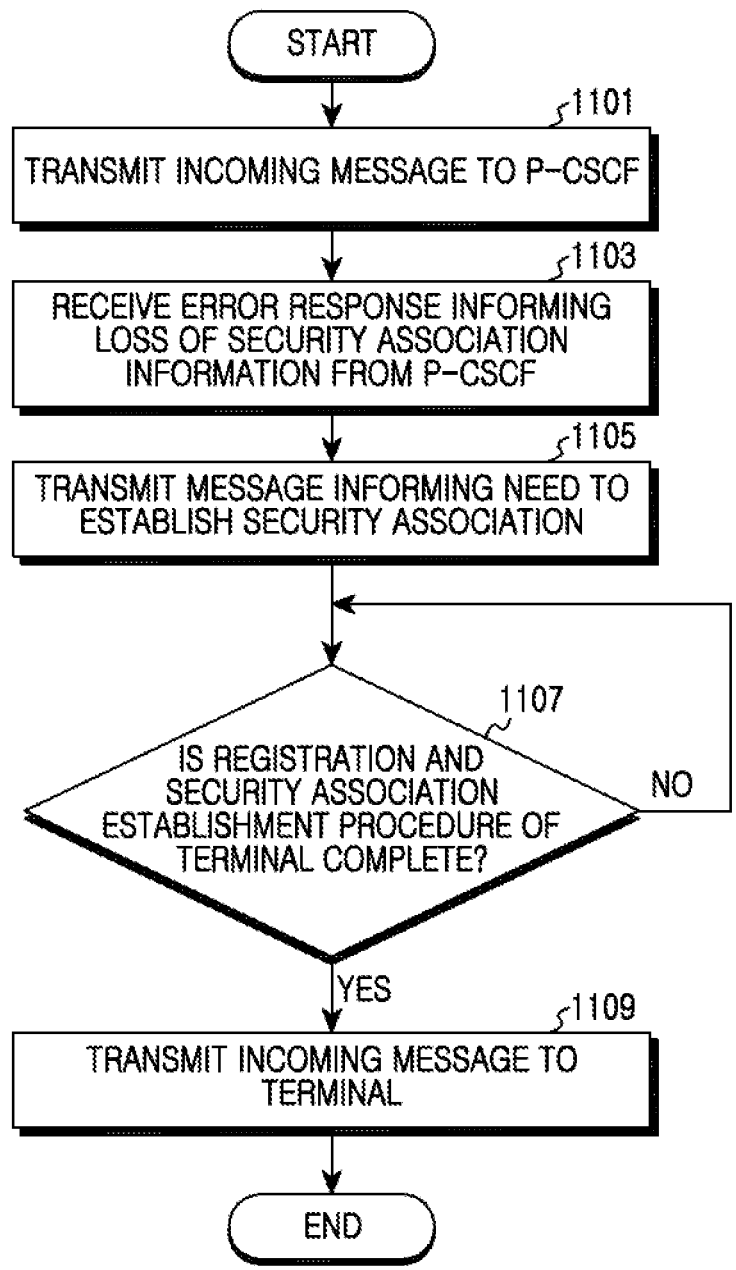
FIG. 11 illustrates a procedure of operating a Serving-Call Session Control Function (S-CSCF) in a communication system according to another exemplary embodiment of the present invention.

FIG. 11 illustrates a procedure of operating an S-CSCF in a communication system according to another exemplary embodiment of the present invention. A method of operating the S-CSCF server 150 for the procedure of processing a security association of FIG. 9 is exemplified in FIG. 11.

Referring to FIG. 11, in step 1101, the S-CSCF server 150 transmits an incoming message for the terminal 110 to the P-CSCF server 140-1. Herein, the incoming message is a message for requesting a session setup. For example, the incoming message may be an INVITE message defined in an SIP.

Subsequently, proceeding to step 1103, the S-CSCF server 150 receives an error response for informing the loss of the security association information from the P-CSCF server 140-1. The error response informs that the terminal 110 loses the security association information. The error response includes at least one of an indicator for informing the loss of the security association information, and information regarding the terminal 110.

Subsequently, proceeding to step 1105, the S-CSCF server 150 transmits a message for informing the need to establish the security association to the P-CSCF server 140-1. In other words, the S-CSCF server 150 transmits the message including an indication for informing the need to establish the security association. That is, the S-CSCF server 150 transmits a message for inducing re-establishment of the security association. The message may be an INVITE request message including the indication.

Thereafter, proceeding to step 1107, the S-CSCF server 150 confirms whether the registration and security association establishment procedures of the terminal 110 are complete. For the registration and security association establishment procedures, the S-CSCF server 150 may transmit or receive a message including at least one of a name and address of the P-CSCF server 140-2, user identification information of the terminal 110, a network ID of the P-CSCF server 140-2, and an IP address of the terminal 110.

Upon completion of the registration and security association establishment procedures, proceeding to step 1109, the S-CSCF server 150 transmits an incoming message to the terminal 110. The incoming message may be an INVITE request message. The incoming message is transmitted through the P-CSCF server 140-2 newly selected by the registration and security association establishment procedures. The newly selected P-CSCF server 140-2 may be identical to or different from the P-CSCF server 140-1.

Figure 12:
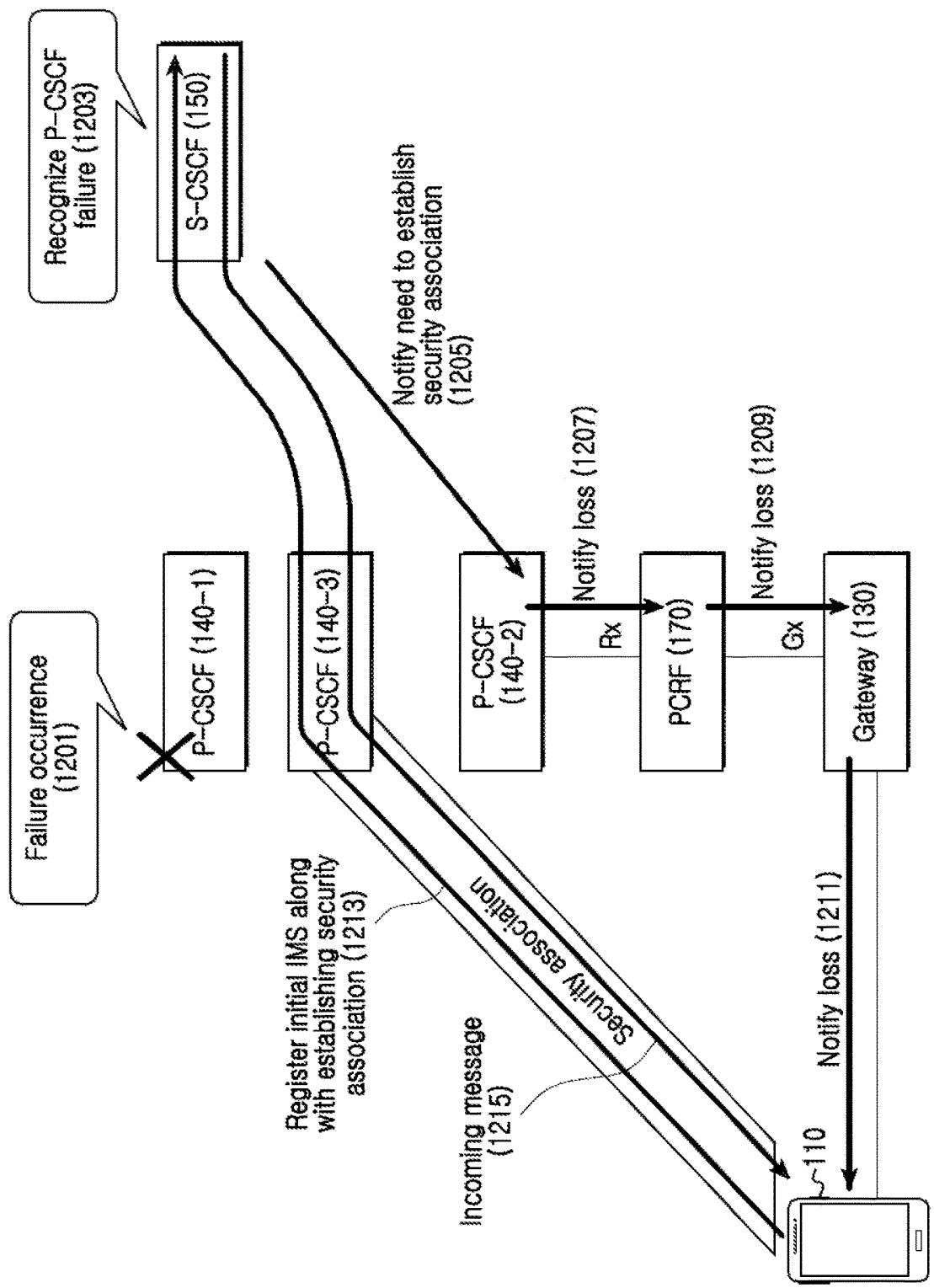
FIG. 12 illustrates a procedure of processing a security association when security information is lost in a communication system according to another exemplary embodiment of the present invention.

FIG. 12 illustrates a procedure of processing a security association when security information is lost in a communication system according to another exemplary embodiment of the present invention. A case where the security association information is lost in the P-CSCF server 140-1 is exemplified in FIG. 12.

Referring to FIG. 12, in step 1201, a failure occurs in the P-CSCF server 140-1. Due to the failure, the security association information regarding the terminal 110 and stored in the P-CSCF server 140-1 is lost.

In step 1203, the S-CSCF server 150 recognizes the failure of the P-CSCF server 140-1. For example, the S-CSCF server 150 may recognize in advance whether the failure occurs in the P-CSCF server 140-1 through a periodical signal exchange for the P-CSCF server 140-1. In addition, the S-CSCF server 150 may recognize the failure of the P-CSCF server 140-1 through a non-response from the P-CSCF server 140-1 with respect to an incoming call. The periodical signal exchange may be a heart beat check.

In step 1205, the S-CSCF server 150 transmits to the P-CSCF server 140-2 a message for informing the need to establish the security association. In other words, the S-CSCF server 150 transmits to the P-CSCF server 140-2 a message for inducing establishment of the security association. The message may be a session setup request message (e.g., an INVITE request) including an indication for informing the need to establish the security association. In this case, the S-CSCF server 150 manages the incoming call in a pending state. If the S-CSCF server 150 recognizes the failure of the P-CSCF server 140-1 through the non-response for the incoming call, the S-CSCF server 150 may assign the P-CSCF server 140-2 as a new P-CSCF for the incoming call, and may transmit to the P-CSCF server 140-2 a message (e.g., INVITE request) for requesting a session setup for the incoming call. In this case, the message for the session setup includes an indication for informing the need to establish the security association. In the exemplary embodiment of FIG. 12, the P-CSCF server in which the failure occurs (e.g., the P-CSCF server 140-1) is different from a P-CSCF server which has received the message for inducing the establishment of the security association (e.g., the P-CSCF server 140-2). However, optionally, if the failure of the P-CSCF server 140-1 is solved, the message for inducing the establishment of the security association may be transmitted to the P-CSCF server 140-1. In this case, the S-CSCF server 150 manages the incoming call in a pending state.

In step 1207, the P-CSCF server 140-2 transmits the notification of the security association information loss to the PCRF server 170. That is, the P-CSCF server 140-2 determines whether the message is a message for inducing re-establishment of the security association by confirming an indication for informing the need to establish the security association from the message received from the S-CSCF server 150. Accordingly, the P-CSCF server 140-2 confirms the PCRF server 170 corresponding to the terminal 110 by using an IP address of the terminal 110, and transmits the notification of the security association information loss to the PCRF server 170. The notification may be delivered through an Rx interface between the P-CSCF server 140-2 and the PCRF server 170. The notification includes at least one of an indication for informing the loss of the security association information and information regarding the terminal 110. The information regarding the terminal 110 may include an IP address of the terminal 110.

In step 1209, the PCRF server 170 delivers the notification of the security association information loss to the gateway 130. Upon receiving the notification of the security association information loss from the P-CSCF server 140, the PCRF server 170 confirms the terminal 110 which has established the lost security association. For example, the PCRF server 170 may confirm the terminal 110 by using an IP address of the terminal 110, included in the notification. In addition, the PCRF server 170 confirms the gateway 130 of a radio access network to which the terminal 110 is attached. For this, the PCRF server 170 may use information stored in the HSS 180. In addition, the PCRF server 170 transmits the notification to the gateway 130. In this case, the notification may be delivered through a Gx interface.

In step 1211, the gateway 130 transmits the notification of the security association information loss to the terminal 110. That is, the gateway 130, which has received the notification of the security association information loss from the PCRF server 170, informs the terminal 110 of the security association information loss. Herein, according to one exemplary embodiment of the present invention, the notification delivered from the gateway 130 to the terminal 110 may be a message defined to inform the loss of the security association information. According to another exemplary embodiment of the present invention, the notification delivered from the gateway 130 to the terminal 110 may be replaced with a re-attach request. That is, the gateway 130 may transmit a message defined to inform the security association information loss, or may provide the re-attach request to the terminal 110.

In step 1213, the terminal 110 establishes a new security association. Upon receiving the notification from the gateway 130, the terminal 110 establishes the security association by performing an initial registration procedure with respect to the IMS network. The terminal 110 may perform the registration procedure similarly to a case of being initially attached to the IMS network. Accordingly, the new security association for the terminal 110 is established. In this case, the P-CSCF 140-3 is selected as a new P-CSCF. The registration procedure and the security association establishment procedure may be performed as described above with reference to FIG. 3 and FIG. 4. If the re-attach is requested in the step 713, the IP address of the terminal 110 may be newly allocated due to the re-attach.

In step 1215, the S-CSCF server 150 transmits the incoming message to the terminal 110 via the P-CSCF 140-3. Even if the terminal 110 performs the registration procedure again, the S-CSCF server 150 is still selected as the S-CSCF for the terminal 110. Therefore, the S-CSCF server 150 may confirm a previous call in a pending state for the terminal 110. Accordingly, upon confirming that the terminal 110 is re-registered, the S-CSCF server 150 may request a session setup for the call in the pending state. In this case, if the P-CSCF server 140-3 selected by the re-registration of the terminal 110 is different from the P-CSCF server 140-2 which has received the message in step 1205, the S-CSCF server 150 needs to cancel the message transmitted for the session setup to the P-CSCF server 140-2 in step 1205. In step 1203, if the failure of the P-CSCF server 140-1 is recognized not by the incoming call but by a periodical signal exchange, the step 1215 may be omitted.

Figure 13:
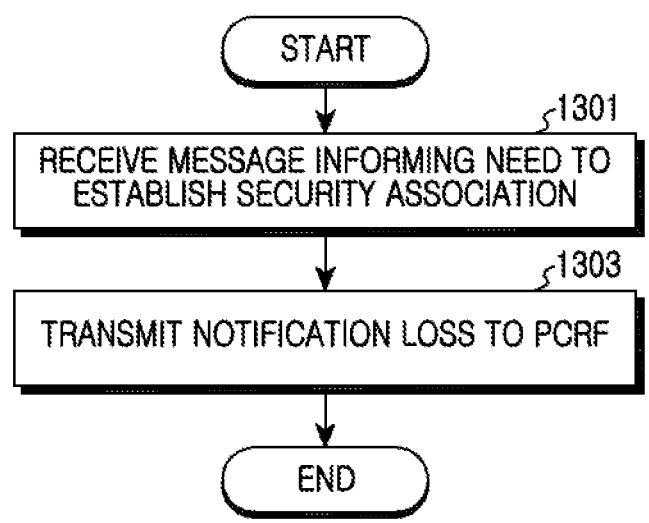
FIG. 13 illustrates a procedure of operating a P-CSCF in a communication system according to another exemplary embodiment of the present invention.

FIG. 13 illustrates a procedure of operating a P-CSCF in a communication system according to another exemplary embodiment of the present invention. A method of operating the P-CSCF server 140-2 for the procedure of processing a security association of FIG. 12 is exemplified in FIG. 13.

Referring to FIG. 13, proceeding to step 1301, the P-CSCF server 140-2 receives a message for informing a need to establish the security association from the S-CSCF server 150. That is, the P-CSCF server 140-2 determines whether the message is a message for inducing re-establishment of the security association by confirming an indication for informing the need to establish the security association from the message received from the S-CSCF server 150. The message may be an INVITE request message including the indication.

Thereafter, proceeding to step 1303, the P-CSCF server 140-2 transmits a loss notification to the PCRF server 170. The loss notification includes at least one of an indicator for informing the loss of the security association information, and information regarding the terminal 110. The information regarding the terminal 110 may include an IP address of the terminal 110.

Figure 14:
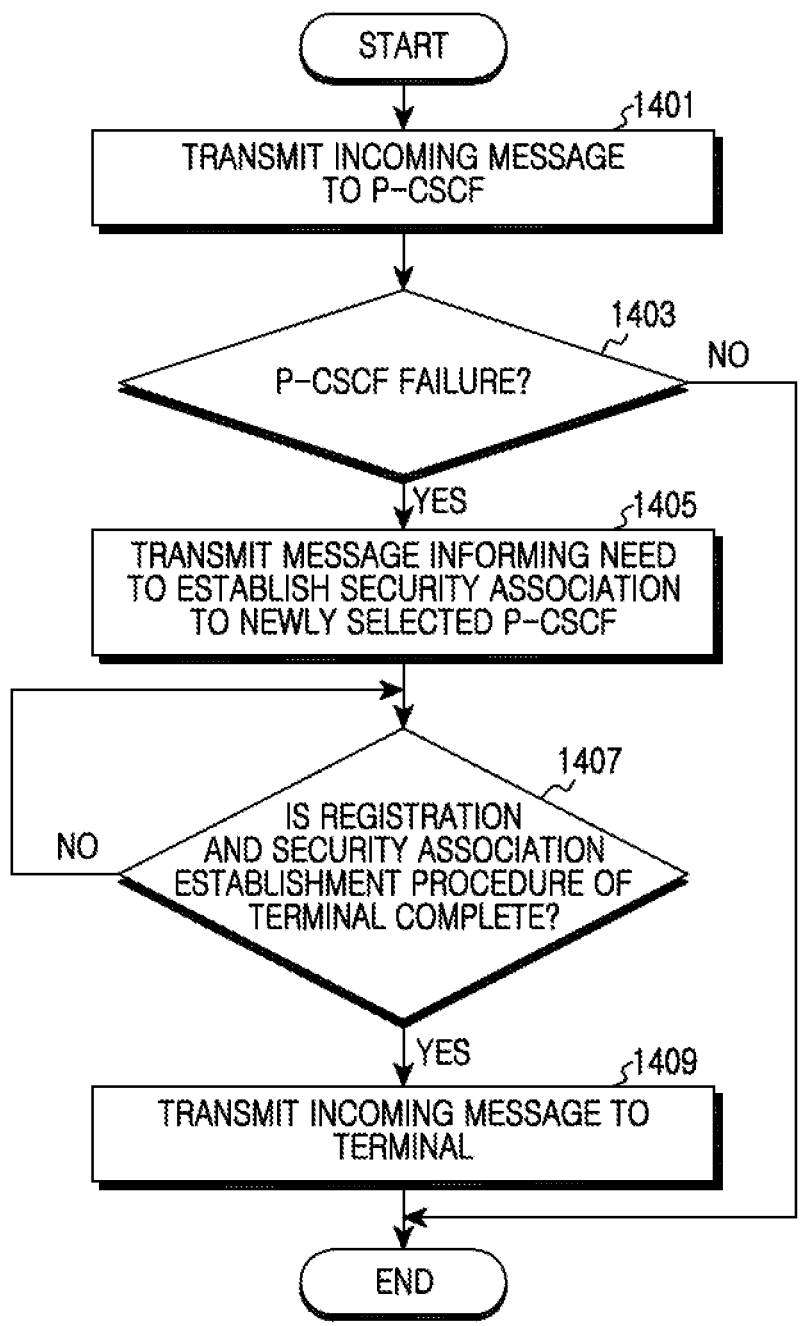
FIG. 14 illustrates a procedure of operating an S-CSCF in a communication system according to another exemplary embodiment of the present invention.

FIG. 14 illustrates a procedure of operating an S-CSCF in a communication system according to another exemplary embodiment of the present invention. A method of operating the S-CSCF server 150 for the procedure of processing a security association of FIG. 9 is exemplified in FIG. 14.

Referring to FIG. 14, in step 1401, the S-CSCF server 150 transmits an incoming message for the terminal 110 to the P-CSCF server 140. Herein, the incoming message is a message for requesting a session setup. For example, the incoming message may be an INVITE message defined in an SIP.

Subsequently, proceeding to step 1403, the S-CSCF server 150 determines whether a failure occurs in the P-CSCF server 140-1. For example, the S-CSCF server 150 may recognize in advance whether the failures occurs in the P-CSCF server 140-1 through a periodical signal exchange for the P-CSCF server 140-1. In addition, the S-CSCF server 150 may recognize the failure of the P-CSCF server 140-1 through a non-response for an incoming message.

If the failure occurs in the P-CSCF server 140-1, proceeding to step 1405, the S-CSCF server 150 transmits a message for informing the need to establish the security association to the P-CSCF server 140-2. In other words, the S-CSCF server 150 assigns the P-CSCF server 140-2 as a new P-CSCF for an incoming call process, and transmits the message including an indication for informing the need to establish the security association. That is, the S-CSCF server 150 transmits a message for inducing re-establishment of the security association. The message may be an INVITE request message including the indication.

Thereafter, proceeding to step 1407, the S-CSCF server 150 confirms whether the registration and security association establishment procedures of the terminal 110 are complete. For the registration and security association establishment procedures, the S-CSCF server 150 may transmit or receive a message including at least one of a name and address of the P-CSCF server 140, user identification information of the terminal 110, a network ID of the P-CSCF server 140, and an IP address of the terminal 110.

Upon completion of the registration and security association establishment procedures, proceeding to step 1409, the S-CSCF server 150 transmits an incoming message to the terminal 110. The incoming message may be an INVITE request message. The incoming message is transmitted through the P-CSCF server 140-3 newly selected by the registration and security association establishment procedures.

Figure 15:
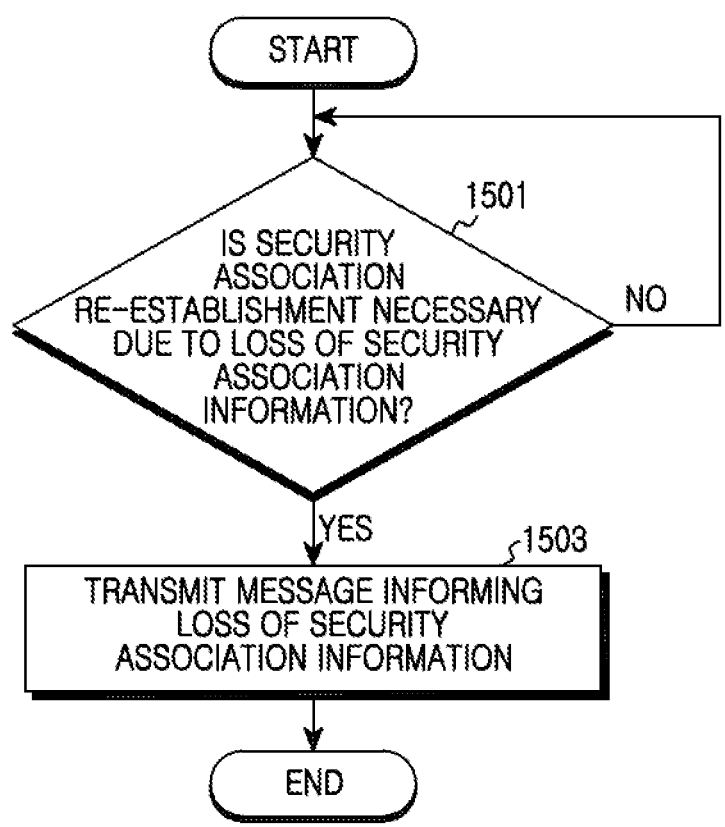
FIG. 15 illustrates a procedure of operating a P-CSCF in a communication system according to another exemplary embodiment of the present invention.

FIG. 15 illustrates a procedure of operating a P-CSCF in a communication system according to another exemplary embodiment of the present invention. A method of operating the P-CSCF server 140 is exemplified in FIG. 15.

Referring to FIG. 15, in step 1501, the P-CSCF server 140 determines whether there is a need to re-establish a security association caused by a loss of the security association information. That is, the P-CSCF server 140 determines whether there is a need to establish the security association of the terminal 110 which has already been registered to an IMS network. Whether there is the need to re-establish the security association may be determined through direct recognition of the security association information loss of the terminal 110 by the P-CSCF server 140 or through the notification from the S-CSCF server 150. That is, the re-establishment of the security association may be requested due to the security association information loss of the terminal 110 or a failure of another P-CSCF server which has established the security association with the terminal 110. The notification from the S-CSCF server 150 is delivered through a message including an indication for informing the need to establish the security association.

If the re-establishment of the security association is necessary, proceeding to step 1503, the P-CSCF server 140 transmits a message for informing the loss of the security association information. Herein, the message informs the security association information loss in the terminal 110 or the security association information loss in the IMS network. The message includes at least one of an indication for informing the loss of the security association information and information regarding the terminal 110. The information regarding the terminal 110 may include an IP address of the terminal 110. The message may be transmitted to the PCRF server 170.

Figure 16:
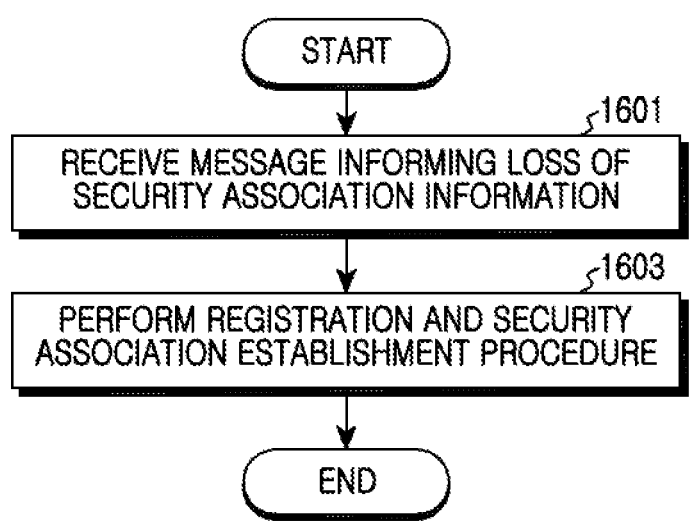
FIG. 16 illustrates a procedure of operating a terminal in a communication system according to another exemplary embodiment of the present invention.

FIG. 16 illustrates a procedure of operating a terminal in a communication system according to another exemplary embodiment of the present invention. A method of operating the terminal 110 is exemplified in FIG. 16.

Referring to FIG. 16, in step 1601, the terminal 110 receives a message for informing a loss of the security association information. The message informs that the terminal 110 loses the security association information or that the IMS network loses the security association information. The message may be a message defined to inform the loss of the security association information. According to another exemplary embodiment of the present invention, the loss notification may be replaced with a re-attach request.

Subsequently, proceeding to step 1603, the terminal 110 performs registration and security association establishment procedures. For this, the terminal 110 may transmit or receive at least one message including security setup information. A new security association is established between the P-CSCF server 140 and the terminal 110 through the registration and security association establishment procedures. For example, the terminal 11 may perform the registration and security association establishment procedures as shown in FIG. 3 and FIG. 4.

Figure 17:
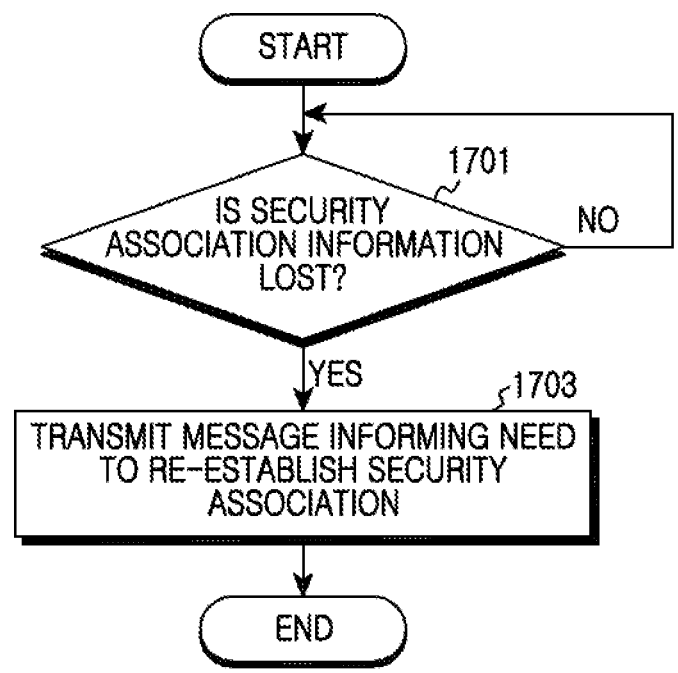
FIG. 17 illustrates a procedure of operating an S-CSCF in a communication system according to another exemplary embodiment of the present invention.

FIG. 17 illustrates a procedure of operating an S-CSCF in a communication system according to another exemplary embodiment of the present invention. A method of operating the S-CSCF server 150 is exemplified in FIG. 17.

Referring to FIG. 17, in step 1701, the S-CSCF server 150 determines whether security association information is lost. The loss of the security association information may occur in the terminal 110 or the P-CSCF server 140. If the security association information is lost in the terminal 110, the S-CSCF server 150 recognizes the loss of the security association information through the notification from the P-CSCF server 140 which has established a security association with respect to the terminal 110. If the security association information is lost in the P-CSCF server 140, the S-CSCF server 150 recognizes the loss of the security association information by recognizing a failure of the P-CSCF server 140.

If the security association information is lost, proceeding to step 1703, the S-CSCF server 150 transmits a message for informing a need to re-establish the security association. The message is transmitted to the P-CSCF server 140. The message includes an indication for informing the need to establish the security association. For example, the message may be an INVITE request message including the indication. That is, the S-CSCF server 150 induces the P-CSCF server 140 to perform an operation for re-establishing the security association.

Figure 18:
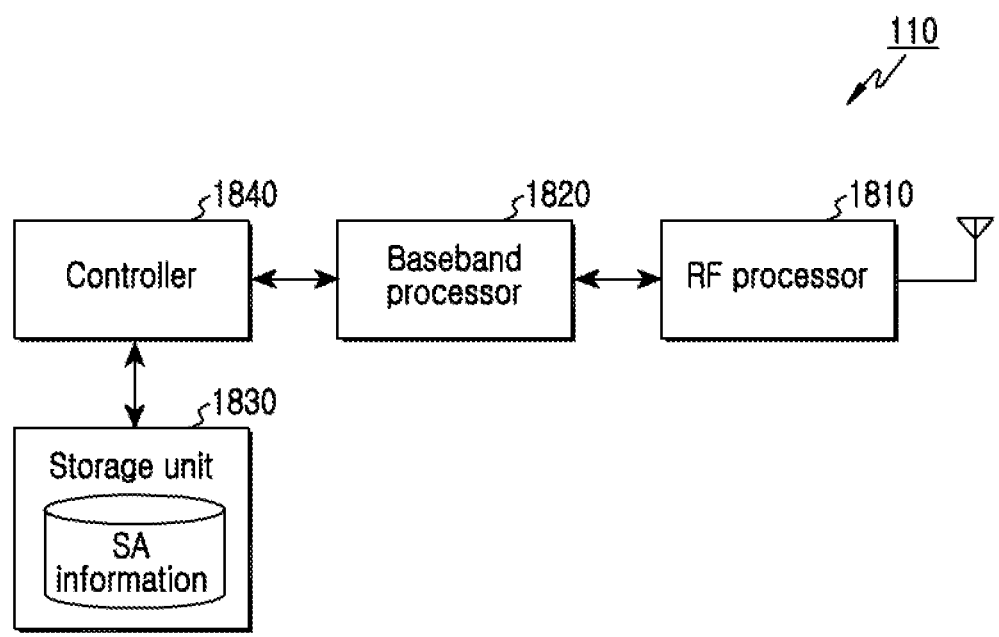
FIG. 18 is a block diagram illustrating a structure of a terminal in a communication system according to an exemplary embodiment of the present invention.

FIG. 18 is a block diagram illustrating a structure of a terminal in a communication system according to an exemplary embodiment of the present invention. A structure of the terminal 110 is exemplified in FIG. 18.

Referring to FIG. 18, the terminal 110 includes a Radio Frequency (RF) processor 1810, a baseband processor 1820, a backhaul communication unit 1830, a storage unit 1830, and a controller 1840.

The RF processor 1810 performs a function for transmitting and receiving a signal through a wireless channel by performing signal band conversion, amplification, or the like. That is, the RF processor 1810 up-converts a baseband signal provided from the baseband processor 1820 into an RF signal, and then transmits the RF signal through an antenna, and also down-converts an RF signal received through the antenna into a baseband signal. For example, the RF processor 1810 may include a transmission filter, a reception filter, an amplifier, a mixer, an oscillator, a Digital to Analog Converter (DAC), an Analog to Digital Converter (ADC), or the like. Although only one antenna is shown in FIG. 18, the terminal 110 may have a plurality of antennas.

The baseband processor 1820 performs a conversion function between a baseband signal and a bit-stream according to a physical layer protocol of the system. For example, in a data transmission process, the baseband processor 1820 generates complex symbols by performing coding and modulation on a transmitted bit-stream. In addition, in a data reception process, the baseband processor 1820 restores a received bit-stream by demodulating and decoding a baseband signal provided from the RF processor 1810. For example, in case of conforming to an Orthogonal Frequency Division Multiplexing (OFDM) scheme, in the data transmission process, the baseband processor 1820 generates complex symbols by performing coding and modulation on a transmitted bit-stream, maps the complex symbols to subcarriers, and then configures OFDM symbols by performing an Inverse Fast Fourier Transform (IFFT) operation and a Cyclic Prefix (CP) insertion operation. In addition, in the data reception process, the baseband processor 1820 splits the baseband signal provided from the RF processor 1810 on an OFDM symbol basis, restores signals mapped to the subcarriers by using a Fast Fourier Transform (FFT) operation, and then restores a received bit-stream by performing demodulation and decoding.

The baseband processor 1820 and the RF processor 1810 transmit and receive signals as described above. Accordingly, the baseband processor 1820 and the RF processor 1810 may be referred to as a transmitter, a receiver, a transceiver, or a communication unit. Further, at least any one of the baseband processor 1820 and the RF processor 1810 may include a plurality of communication modules to support a plurality of different communication protocols. Further, at least any one of the baseband processor 1820 and the RF processor 1810 may include different communication modules to process signals of different frequency bands.

In addition, the baseband processor 1820 and the RF processor 1810 are constitutional elements for transmitting and receiving a signal through a radio channel. In other words, the baseband processor 1820 and the RF processor 1810 are interfaces used when the terminal 110 performs wireless communication. According to another exemplary embodiment of the present invention, the terminal 110 may include an interface for wired communication in replacement of or in conjunction with the baseband processor 1820 and the RF processor 1810.

The storage unit 1830 stores data such as a basic program, application program, configuration information, or the like for an operation of the terminal 110. In particular, the storage unit 1830 stores information regarding a security association configured when it is registered to an IMS network. For example, the information regarding the security association may include a key value, an encryption algorithm, an integrity algorithm, a packet sequence number, a hash value, or the like. In addition, the storage unit 1830 provides the stored data at the request of the controller 1840.

The controller 1840 provides an overall control to the terminal 110. For example, the controller 1840 transmits and receives a signal via the baseband processor 1820 and the RF processor 1810 or the backhaul communication unit 1830. In addition, the controller 1840 writes data to the storage unit 1830 and reads the data. For this, the controller 1840 may include at least one processor. For example, the controller 1840 may include a Communication Processor (CP) for performing a control for communication and an Application Processor (AP) for controlling a higher layer such as an application program or the like. According to the exemplary embodiment of the present invention, the controller 1840 may provide control such that a procedure of establishing a security association is started when the security association information stored in the storage unit 1840 is lost or when the security association information is lost in the IMS network. For example, the controller 1840 may provide control to operate similarly to the terminal 110 of FIG. 2, FIG. 9, or FIG. 12, or may provide control to perform the procedure of FIG. 6 or FIG. 16. The controller 1840 according to the exemplary embodiment of the present invention operates as follows.

According to the exemplary embodiment of the present invention, the controller 1840 receives a message for informing the loss of the security association via the RF processor 1810 and the baseband processor 1820. The message informs that the terminal 110 loses the security association information or the IMS network loses the security association information. According to another exemplary embodiment of the present invention, the message may be replaced with a re-attach request. In addition, the controller 1840 performs registration and security association establishment procedures. For this, the controller 1840 may transmit or receive at least one message including security setup information via the RF processor 1810 and the baseband processor 1820. Through the registration and security association establishment procedures, a new security association is established between the P-CSCF server 140 and the terminal 110.

Figure 19:
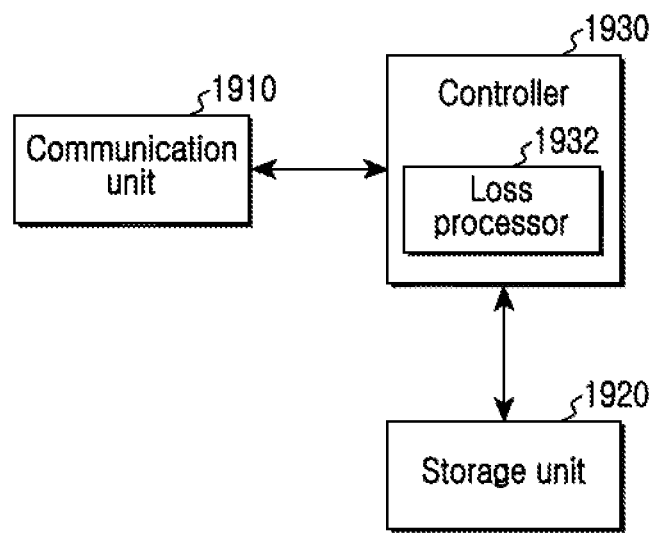
FIG. 19 is a block diagram illustrating a structure of a network entity in a communication system according to an exemplary embodiment of the present invention.

FIG. 19 is a block diagram illustrating a structure of a network entity in a communication system according to an exemplary embodiment of the present invention. A structure of the gateway 130, a structure of the P-CSCF server 140, a structure of the S-CSCF server 150, a structure of the PCRF server 170, or a structure of a device which is a combination of the P-CSCF server 140 and the S-CSCF server 150 is exemplified in FIG. 19.

As shown in FIG. 19, the network entity includes a communication unit 1910, a storage unit 1920, and a controller 1930.

The communication unit 1910 provides an interface for performing communication with other nodes in a network. That is, the communication unit 1910 converts a bit-stream transmitted from the network entity to a different node into a physical signal, and converts a physical signal received from the different node into a bit-stream. That is, the communication unit 1910 transmits and receives a signal. Accordingly, the communication unit 1910 may be referred to as a transmitter, a receiver, or a transceiver.

The storage unit 1920 stores data such as a basic program, application program, configuration information, or the like for an operation of the network entity. In addition, the storage unit 1920 provides stored data at the request of the controller 1930.

The controller 1930 controls overall operations of the transmitting end 110. For example, the controller 1930 transmits and receives a signal via the wireless communication unit 1910. Further, the controller 1930 writes data to the storage unit 1920 and reads the data. According to the exemplary embodiment, the controller 1930 includes a loss processor 1932 for performing a control depending on a loss of the security association information in the terminal or the IMS network.

If the network entity is the gateway 130, the controller 1930 may provide control such that the network entity operates similarly to the gateway 130 of FIG. 2, FIG. 9, or FIG. 12, or provide control to perform the procedure of FIG. 7. For example, according to one exemplary embodiment of the present invention, the controller 1930 receives a loss notification for security association information from an IMS network via the communication unit 1910. The loss notification informs that the terminal 110 loses the security association information or the IMS network loses the security association information. Thereafter, the controller 1930 transmits the loss notification to the terminal 110. Herein, the loss notification may be a message defined to inform the loss of the security association information. According to another exemplary embodiment of the present invention, the loss notification may be replaced with a re-attach request.

If the network entity is the P-CSCF server 140, the controller 1930 may provide control such that the network entity operates similarly to the P-CSCF server 140 of FIG.

2, FIG. 9, or FIG. 12, or provide control to perform the procedure of FIG. 5, FIG. 10, FIG. 13, or FIG. 15. For example, according to one exemplary embodiment of the present invention, the controller 1930 determines whether there is a need to re-establish a security association due to a loss of the security association information. Whether there is the need to re-establish the security association may be determined through direct recognition of the security association information loss of the terminal 110 by the P-CSCF server 140 or through the notification from the S-CSCF server 150. If the re-establishment of the security association is necessary, the controller 1930 transmits a message for informing the loss of the security association information to the PCRF server 180 via the communication unit 1910. Herein, the message informs the security association information loss in the terminal 110 or the security association information loss in the IMS network. The message includes at least one of an indication for informing the loss of the security association information and information regarding the terminal 110.

If the network entity is the S-CSCF server 150, the controller 1930 may provide control such that the network entity operates similarly to the S-CSCF server 150 of FIG. 2, FIG. 9, or FIG. 12, or provide control to perform the procedure of FIG. 11, FIG. 14, or FIG. 17. For example, according to one exemplary embodiment of the present invention, the controller 1930 determines the loss of the security association information. The loss of the security association information may occur in the terminal 110 or the P-CSCF server 140. If the security association information is lost, the controller 1930 transmits a message for informing a need to re-establish the security association to the P-CSCF server 140 via the communication unit 1910. The message includes an indication for informing the need to establish the security association. For example, the message may be an INVITE request message including the indication.

If the network entity is the PCRF server 170, the controller 1930 may provide control such that the network entity operates similarly to the PCRF server 170 of FIG. 2, FIG. 9, or FIG. 12, or provide control to perform the procedure of FIG. 8. For example, according to one exemplary embodiment of the present invention, the controller 1930 receives a loss notification for the security association information from the P-CSCF server 140 via the communication unit 1910. The loss notification includes at least one of an indicator for informing the loss of the security association information, and information regarding the terminal 110. In addition, the controller 1930 confirms a gateway corresponding to the terminal 110, and transmits the loss notification to the gateway 130 via the communication unit 1910. The loss notification induces the gateway 130 to notify the loss of the security association information to the terminal 110.

Methods based on the embodiments disclosed in the claims and/or specification of the present invention can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present invention.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an exemplary embodiment of the present invention via an external port. In addition, an additional storage device on a communication network can have an access to the device for performing the exemplary embodiment of the present invention.

In the aforementioned specific exemplary embodiments, a constitutional element included in the invention is expressed in a singular or plural form according to the specific example embodiment proposed herein. However, the singular or plural expression is selected properly for a situation proposed for the convenience of explanation, and thus the various exemplary embodiments of the present invention are not limited to a single or a plurality of constitutional elements. Therefore, a constitutional element expressed in a plural form can also be expressed in a singular form, or vice versa.

While the present invention has been shown and described with reference to certain preferred embodiments thereof, it will be understood by those skilled in the art that various changes in form and details may be made therein without departing from the spirit and scope of the present invention as defined by the appended claims. Therefore, the scope of the present invention is defined not by the detailed description thereof but by the appended claims, and all differences within equivalents of the scope will be construed as being included in the present invention.

What is claimed is:

1. A server for a proxy-call session control function (P-CSCF) of an internet protocol multimedia subsystem (IMS) in a communication system, the server comprising:
at least one transceiver; and
at least one processor configured to:
receive, through the at least one transceiver, a notification of an incoming call being generated for a terminal,
in response to receiving the notification of the incoming call being generated for the terminal, recognize a loss of security association (SA) information of the terminal, wherein the loss of the SA information of the terminal is recognized when a response to a request encrypted based on a key value determined by the SA information to the terminal is not received from the terminal within a specified time, the request and the response are defined in a session initiation protocol (SIP),
determine an establishment of an SA with the terminal in response to the recognizing of the loss of the SA information of the terminal, and
transmit, to the terminal through the at least one transceiver, via a policy and charging rules function (PCRF) server and a gateway, a first message including an indication for informing the loss of the SA information, while the incoming call is managed in a pending state.

2. The server of claim 1, wherein the at least one processor is further configured to:
   transmit, through the at least one transceiver to the terminal, a session setup request in response to receiving the notification of the incoming call being generated for the terminal,
   determine whether a response to the session setup request is received within a pre-defined time, and
   recognize the loss of the SA information of the terminal based on determining that the response to the session setup request is not received within the pre-defined time.

3. The server of claim 1, wherein the at least one processor is further configured to determine the establishment of the SA by transmitting, to a serving-call session control function (S-CSCF) server through the at least one transceiver, a second message indicating the loss of the SA information and receiving, through the at least one transceiver, a message notifying a need to establish the SA from the S-CSCF server.

4. The server of claim 1, wherein the at least one processor is further configured to transmit, through the at least one transceiver, a session setup request to the terminal after completing the establishment of the SA.

5. A terminal in a communication system, the terminal comprising:
   at least one transceiver; and
   at least one processor configured to:
      receive, through the at least one transceiver from a proxy-call session control function (P-CSCF) server via a policy and charging rules function (PCRF) and a gateway, a message including an indication for informing a loss of security association (SA) information of the terminal, while and incoming call is managed in a pending state in the P-CSCF server, wherein the loss of the SA information of the terminal is recognized when a response to a request encrypted based on a key value determined by the SA information to the terminal is not received from the terminal wihtin a specified time, the request and the response are defined in a session initiation protocol (SIP), and
      in response to receiving the message, perform a procedure for establishing an S.A.

6. The terminal of claim 5, wherein the at least one processor is further configured to receive, through the at least one transceiver, a request for a session setup for an incoming call after completing the establishment of the SA.

7. A method for an internet protocol multimedia subsystem (IMS) in a communication system, the method performed by a server comprising:
   receiving a notification of an incoming call being generated for a terminal;
   in response to receiving the notification of the incoming call being generated for the terminal, recognizing a loss of security association (SA) information of the terminal, wherein the loss of the SA information of the terminal is recognized when a response to a request encrypted based on a key value determined by the SA information to the terminal is not received from the terminal within a specified time, the request and the response are defined in a session initiation protocol (SIP);
   determining an establishment of an SA with the terminal in response to the recognizing of the loss of the SA information of the terminal; and
   transmitting, to the terminal, via a policy and charging rules function (PCRF) server and a gateway, a first message including an indication for informing the loss of the SA information, while the incoming call is managed in a pending state.

8. The method of claim 7, further comprising:
   transmitting, to the terminal, a session setup request in response to receiving the notification of the incoming call being generated for the terminal;
   determining whether a response to the session setup request is received withing a pre-defined time; and
   recognizing the loss of the SA information of the terminal based on determining that the response to the session setup request is not received within the pre-defined time.

9. The method of claim 7, further comprising:
   transmitting, to the terminal, a session setup request after completing the establishment of the SA.

* * * * *